United States Patent

Chulak

[15] 3,700,823

[45] Oct. 24, 1972

[54] COMBINED ALARM TRANSMISSION AND SERVICE CALL SYSTEM

[72] Inventor: William Chulak, Chambly, Quebec, Canada

[73] Assignee: Northern Electric Company, Limited, Montreal, Quebec, Canada

[22] Filed: Sept. 2, 1971

[21] Appl. No.: 177,389

[52] U.S. Cl. ....................179/18 B, 179/5 R, 179/19

[51] Int. Cl. ..............................................H04m 3/42

[58] Field of Search.....179/5 R, 18 EB, 18 B, 18 BB, 179/19, 18 AG, 18 AH

[56] References Cited

UNITED STATES PATENTS

| | | | |
|---|---|---|---|
| 3,427,404 | 2/1969 | Finkhauser | 179/18 BD |
| 3,546,393 | 12/1970 | Joel | 179/18 B |
| 3,555,196 | 1/1971 | Singer | 172/18 B |
| 3,598,917 | 8/1971 | Hoboken | 179/5 R |

*Primary Examiner*—Ralph D. Blakeslee
*Attorney*—Philip T. Erickson

[57] ABSTRACT

Multifrequency signaling equipment is used to transmit alarm initiation and alarm cancelling signals and also signals for connecting calls over channels selected from a plurality connecting two locations at each of which a large access switch is located. Just after a channel is seized by a connection through one switch a multifrequency signal is sent over the connection and channel to direct the connection at the other switch. Alarm signals bypass the second switch. A reply tone releases the transmitter lockout circuit dropping the multifrequency signaling equipment off the call and allowing it to process another call. Alarm signals are periodically repeated if not acknowledged by reply tone. The system may operate in both directions or a one way system may be used with manual calling in the other direction. An alternative form of systems uses a particular channel for the signaling function and in this case alarm signals do not pass through either of the large access switches. The system is designed particularly for operator assistance, information and repair service calls into a telephone company service center.

33 Claims, 33 Drawing Figures

COMBINED ALARM TRANSMISSION AND SERVICE CALL SYSTEM

This invention relates to telephone systems and in particular to communication facilities connecting telephone company service centers and outlying central offices.

In recent years, economy and effectiveness in the administration of telephone systems has been improved by the establishment of centralized technical and operating facilities. Some of these facilities, such as remote testing of subscriber lines and central office equipment from a test center, are largely matters of internal telephone company procedures, whereas others, such as information services and operator assistance services are services that telephone customers request and usually expect to obtain by dialing a short code, such as O for operator assistance and 411 for local information. In connection with repair service it is also desirable to use a short code of 3 or 4 digits, not merely because subscribers are frequently used to it, but also because when a repair man makes a call to obtain a test of the line or to ask his dispatches where to go next, his dialing of a short code reassures any nearby telephone customer that there is no danger of the call being charged as a long distance call.

With the installation of test centers which make it possible to test lines over voice frequency circuits without the direct current continuity that was formerly required, long distance connections from customer stations are usually required to test the results of repair work, as well as to handle communications regarding supplies needed, conditions reported, and dispatching to subsequent assignments. The growth of such traffic has tended to overload the simple tie lines from central offices to service centers which where established so that a customer calling to ask for repair service would be connected directly to the repair center when he dialed the 4 digit code for repair service. In some locations, there has been an attempt to put calls for repair service and the like into the same tie line groups used for obtaining operator assistance on collect or person to person calls, burdening the operator with the obligation of quickly distinguishing requests for repair services from requests for her direct assistance.

Furthermore, when many tie lines are provided from outlying central offices to centralized service positions, not only is there inefficiency as the result of light average use of the lines so installed, but also there is a risk that at certain periods there would be more calls coming in over one or another of the groups of these lines than the personnel dealing with them could handle, which has led to the installation of recording facilities to transmit to the customer a recording saying that his call will be presently attended to, but asking him to wait on the line.

In the development of centralized testing of the telephone plant the economical provision of the necessary communication channels from test centers to outlying central offices was provided by devising new systems adapted to use the common telephone plant rather than facilities "dedicated" for company use. To deal with the present growth of "dedicated" facilities for service calls, both the no-charge service calls of customers and the service traffic of company personnel, this invention provides economical arrangements by a consolidation of the various needed facilities with particular regard to priorities and traffic peculiarities, resulting in an overall efficiency that would be difficult to achieve by putting the traffic, or most of it, through the common network. It incidentally makes more economical a greater centralization of operator assistance positions, which may bring additional savings.

The present invention utilizes an audio multifrequency signal transmitter and a corresponding receiver at each end of the route, i.e., at the outlying central office and at the location of the various service centers, which can be referred to collectively as the "service center" even though its separate parts — repair, information, operator assistance, etc. — may be separately managed and located. The same service center incoming trunk circuits may be connected for use with more than one route if the multifrequency receiver is arranged to operate a route relay, as described below, when it seizes an idle incoming trunk of a particular service group at the service center. The system will be described, for simplicity, as if only one route were involved. Each route of the system has at each end, a crossbar switch or some other large capacity switch, or system of switches equivalent thereto.

The service calls coming from customer or official stations seize the first available outgoing service trunk circuit of the group assigned to the service requested at the outlying central office and then seize the first available channel facility of the route, closing the previously mentioned crossbar switch at the outlying central office to connect the circuits so seized and causing the multifrequency signaling system to find, at the service center, an idle service trunk of the particular type needed (test desk trunk, operator assistance trunk, etc.) and connect it through. Some traffic goes the other way by a similar procedure — e.g., calls to numbers at the outlying office from the test desk, operator assistance position, etc., in a "tie line" type of operation. Hence both a multifrequency transmitter and a multifrequency receiver are normally to be provided at each end of the route.

In order to assure operator assistance services a priority over repair, test and ordinary tie line operations, as soon as two thirds or some other predetermined fraction of the available facilities are busy, only calls to operator assistance positions are thereafter admitted to the remaining facilities. This priority is also accorded to transmission of signals indicating the initiation, cancellation or updating of an alarm condition, which are signals so brief that it is not necessary in this case to close a crosspoint of the crossbar switch at the service center end of the route.

The alarm signals may be coded and transmitted by the multifrequency transmitter in the same way as service destination codes, because the number of codes available in a single voice frequency circuit largely suffices for selecting the various service center destinations and also the various alarm indicator panel destinations. In the case of alarm signals, instead of the previously mentioned route relay of the receiver there may be a route relay that gives the alarm panel an indication of the location at which the particular alarm signal originated.

The invention takes advantage of the fact that most of the traffic to the telephone company service centers is directed to one of the several functional centers served by several manned positions which together can handle the traffic of a group of trunks handling the same type of calls. The number of destination codes, even for a large volume of traffic, is, hence, quite limited and for a particular destination any idle circuit of a group is equally suitable. This applies not only to requests from customers for information services or operator assistance,but even to requests from repair men for a jack-terminated trunk at the test desk, ready for an immediate test (a so-called "selector level trunk"), or for a key-terminated trunk at the test center or at a repair dispatching center. Likewise service destinations served by so-called key telephone sets may be served by a group of lines. Consequently, the limited number of destination codes for a large volume of traffic permits a single signaling circuit to direct the connection of a very large number of interoffice channels while still leaving opportunities for transmission without appreciable delay of alarm signals, even minor alarms such as indications of conditions approaching overload and some merely potential sources of trouble. Where the outlying terminal of the systems serves several central offices, however, a two-pulse or three-pulse alarm signal can be arranged to provide sufficient codes.

To fulfill efficiently the needs of the various types of traffic inwards to service centers while retaining capability of directing connections for a scattering of outward calls over the same collection of channels, the multifrequency signaling circuits must be organized not only to operate in both directions, but to hold briefly for a response and to time out promptly in its absence, as well as to queue signals awaiting transmission. Since each message is only a single tone pulse, except for the possibility of multipulse alarm signals just mentioned, even the connections that have to queue up longest before they can be attempted are either effected or reported busy without any noticeable delay.

Although a permanently assigned channel must be used to connect the multifrequency signaling units which serve a group of the communication channels of a particular route, in the preferred form of system embodying the invention the multifrequency and reply tone transmitters and receivers, which may be referred to collectively as the signaling units of the system, communicate with each other over whatever channel is selected for the proposed connection. Once the connection is made the normal supervision arrangements take care of the disconnection operation at the end of the call (and in the case of the connections with a dialing facility at the end remote from the calling party, the dial pulses are transmitted by the usual signaling arrangements provided for second-dial-tone circuits). The signaling units of the system of this invention drop off from a call as soon as it is connected through the system and are not concerned with the further progress of the call or with its disconnection.

The system of the invention provides different reaction at the central and at the outlying locations when calls from both ends have simultaneously seized the same channel facility and have blocked each other's multifrequency receivers, the call from the center being required to re-seize a channel facility and the call from the outlying office being merely required to repeat the signal pulse over the facility previously seized. If different channel facilities are seized when calls are simultaneously initiated from both ends of the system, which is arranged to occur when traffic is light, both calls are processed, but only one at a time can be permitted to operate either of the crossbar switches.

A separate reply tone generator activated by the multifrequency receiver is used and is arranged to send its signal through the multifrequency receiver's connection with the channel facilities. A separate reply tone receiver is connected to the talking path of the trunk circuit connected at the particular time to the multifrequency transmitter and is activated for an interval following the transmitter pulse.

Alarms are associated with one or a few trunk circuits each having an appearance on one of the verticals of the crossbar switch of the system at the outlying office. They are transmitted in the same manner as a request for service, by seizure of a channel facility, but no connection is ever cut through on the crossbar switch at the service center, because the multifrequency pulse sent carriers the entire message and the facility is released by the alarm trunk circuit as soon as the reply tone is received.

If a separate channel is used for the multifrequency signals that set up connections on the crossbar switches, thus sacrificing the advantage of setting up the connection over the facility channel selected for the call, alarm signals would be arranged to go over that separate channel, without utilizing either of the crossbar switches. In that form of the invention however, different means are necessary to assure to both ends of the system reasonably fast access to the channel facilities and extra complications are necessary to provide for switching in spare channel if the "order wire" channel should suffer a transmission breakdown. A single "order wire" channel, however, can be arranged for adequate two-way use to set up connections on the controlled channel facilities.

To connect very small central offices to the service center where the traffic cannot be easily grouped with that of a larger outlying office and handled in the general way previously described, a partial application of these techniques can be made that is quite useful. In this case only a one-way multifrequency signaling system is used, providing connections to service positions at the service center and providing automatic transmission much as in the systems above-mentioned, but calls outward from the service center are manually put on to idle channel facilities and diverted to a dial-controlled incoming trunk circuit at the outlying central office, thus by-passing both the large-access switches used in making calls to the service center.

The arrangements of equipment and methods of operation involved in the invention are best understood by reference to the drawings in which:

FIG. 24 is a diagram of a modification of the multifrequency receiver of FIG. 2 for the reception of 3-pulse alarm signals;

Figure 1:
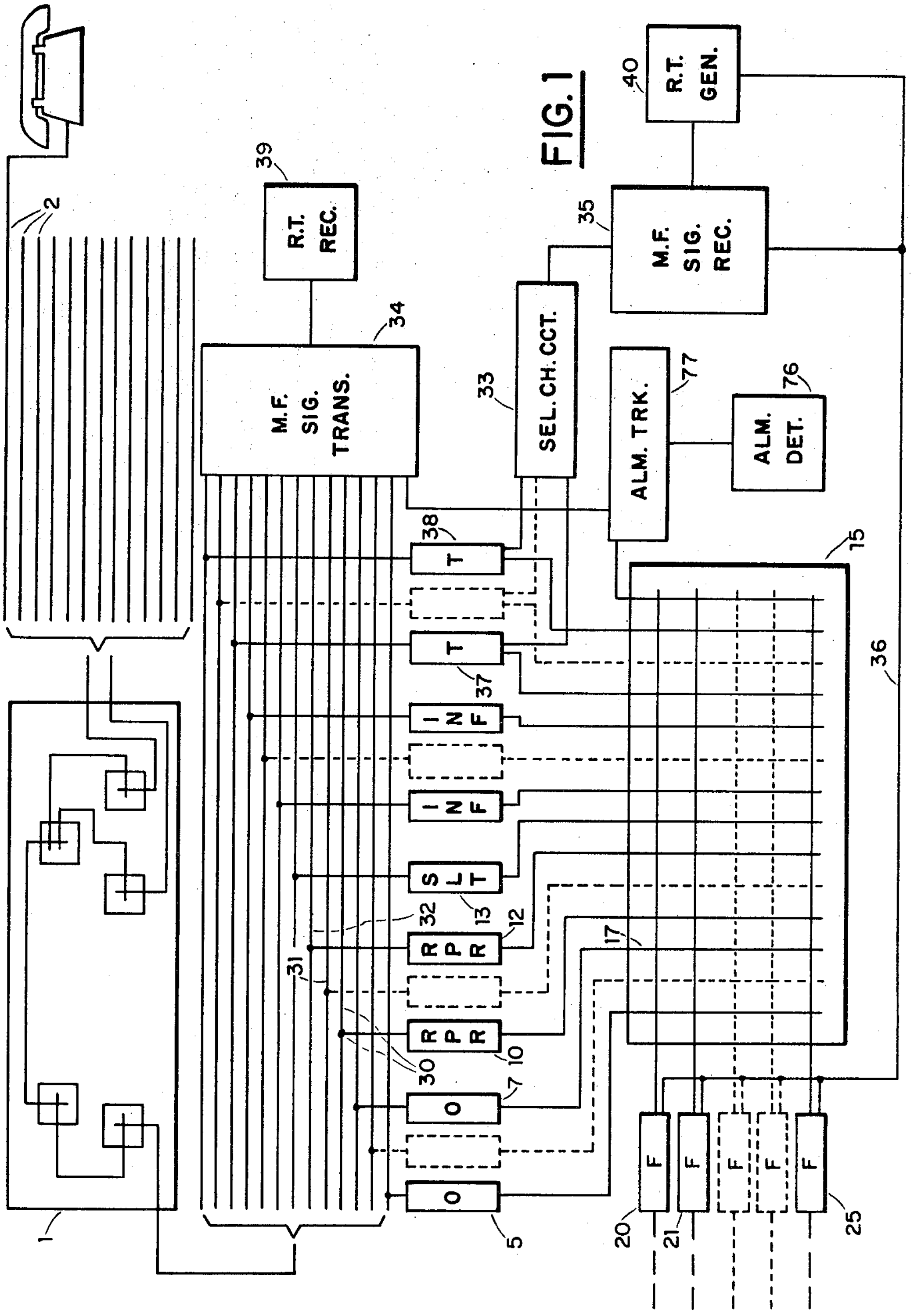
FIG. 1 is a block diagram of the outlying central office portion of a preferred kind of system embodying the invention.
Figure 2:
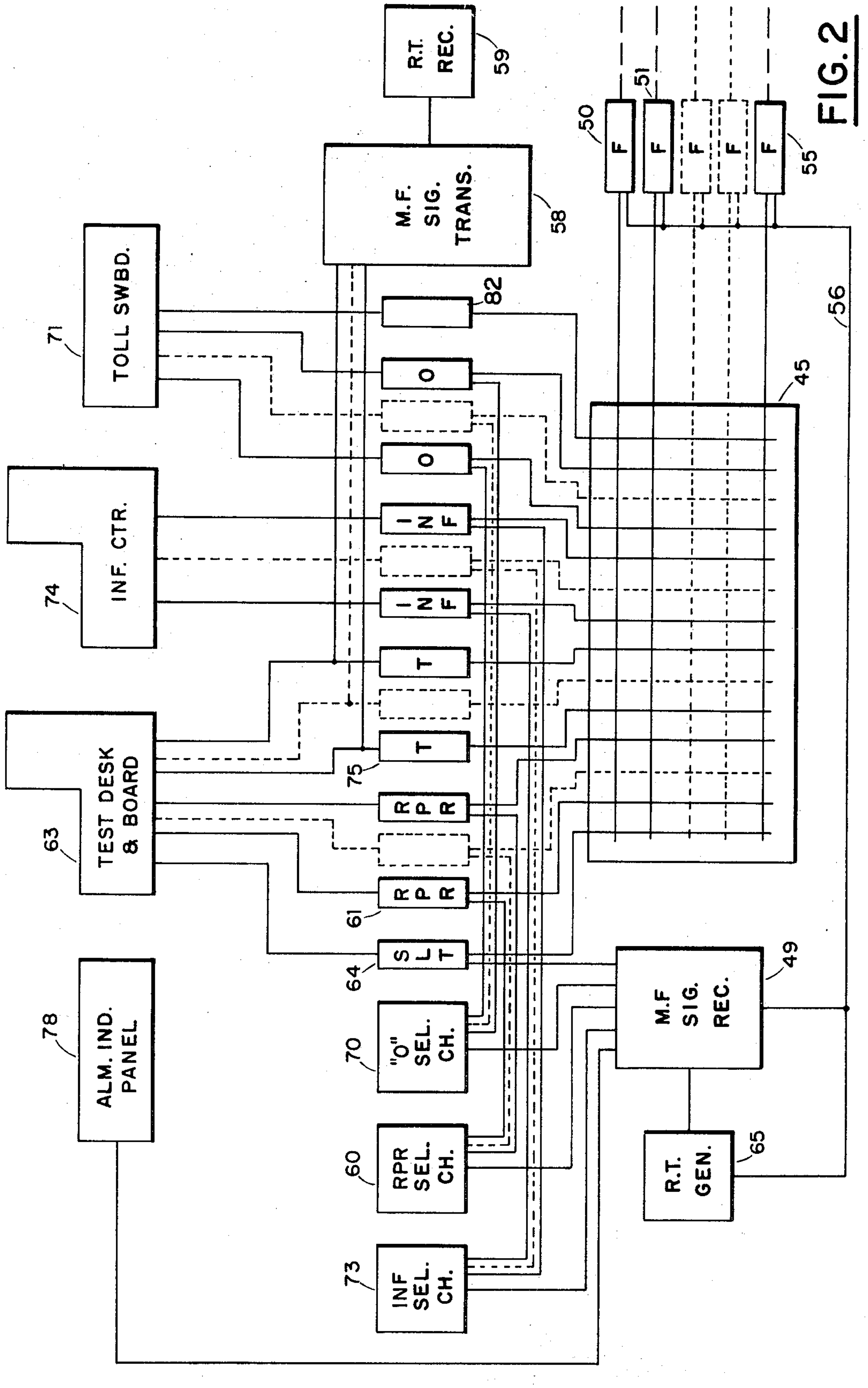
FIG. 2 is a block diagram of the service center portion of the same system.

FIGS. 1 and 2 show the general organization of a system embodying the invention. FIG. 1 shows the portion of the system at an outlying central office and FIG. 2 shows the portion of the system at the location of the service centers. The block 1 is the switching equipment at the outlying central office. The local subscriber lines 2 are the lines of the local telephone customers served by switching equipment 1 for both local and long distance calls. Calls from local subscriber stations for information service, repair service or for operator assistance on call (such as collect calls or person to person calls particularly) result in a connection being established through the switching network 1 between the calling subscriber's line and a service trunk circuit related to the particular type of service. The type of service is specified by the subscriber by dialing the corresponding code, for example the single digit zero for operator assistance, the code 411 for information service relating to the region in which the customer is located and the code 4714 for repair service.

There must usually be means for handling several calls at once for each of these type of services. Hence, several outgoing service trunk circuits are provided in each category, for example the trunk circuits 5 and 7 for operator assistance service and the trunk circuits 10 and 12 for repair service. Between each pair of trunk circuits just mentioned, an additional trunk circuit is shown in dotted lines to show that there may be more, usually many more, such circuits in the group, the number of additional circuits depending upon the number and type of lines served by the central office.

Each of the lines of a group concerned with the same type of service is reached by dialing the same code. The call picks up the first idle circuit of the particular group, in a known manner similar to that discussed below in detail in connection with other circuits. If all trunk circuits of the particular group are busy, a busy tone will immediately be returned to the calling party.

Some of the service trunk circuits are concerned with services that are not normally called by local subscribers but which may be called by telephone company personnel. For example, a telephone repair man may want to get an immediate test of a line and hence, instead of calling the usual repair service number he will dial another number that will give him a jack terminated trunk at the repair position of the test desk. The test man will reply to this call by plugging his primary cord into the jack in question and after the exchange of a few words can make the test right away without setting up any further connections. Since jack terminated trunks of this sort were in the remote past always "selector level" trunks, circuits relating to this type of test service are still commonly called selector level trunks. The availability of this type of test service is indicated in FIG. 1 by the selector level trunk 13.

Each of the service trunk units shown in FIG. 1 is connected to the vertical members of a crossbar switch 15, which serves only service-type traffic. In some installations it may be necessary, because of the volume of the traffic, to use a combination or a number of crossbar switches, but since a crossbar switch provides a large number of vertical members on one switch, a single switch is likely to be sufficient for many installations. Accordingly the invention will be illustrated in terms of a system using a single large access crossbar switch at each end of the circuit, but it will be understood that multiple switch combinations can be used in the usual way in a similar context.

There may be some service center destination where only one line and hence only one trunk circuit is needed because of the relatively light use, in which case no selection chain circuit is needed. The selector level trunk circuit 64 (FIG. 2) is shown in that form, but it is not meant to be inferred that this particular type of trunk is the kind of which only one would be needed at the test desk; indeed, usually several of them would be provided just as in the case of other repair service trunks.

The connections shown in FIG. 1 in and out of the trunk circuits 5, 7, 10, 12, 13, and the others whether or not numbered, are generally multiple connections, two conductors for the talking circuits and sometimes one or more parallel conductors for supervision of the circuit among the various units of the office, as will be readily understood (FIGS. 3, 5, 17 and 18).

The progress of a call in the portion of the system shown in FIG. 1 begins, as above-mentioned, when a subscriber dials the number corresponding to the service desired and in consequence is connected to a trunk circuit in the group allocated to that particular service (assuming that not all of them are busy). This line circuit has an appearance on the crossbar switch 15, for example the repair trunk circuit 10 is connected to the vertical 17 of the crossbar switch 15. When the trunk circuit is seized as the result of the call being connected to it, a line relay operates, the trunk circuit is made busy so as to divert other repair service calls to other trunks. In the present context the service trunk circuit needs the assistance of a voice frequency signaling system to set up a connection to the service center. The multi-frequency signaling transmitter 34 is arranged to serve only one request for a connection at a time, as further described below, to provide sequential execution of the various orders. In the manner more fully explained below, the service trunk circuit 10 causes a crossbar switch 15 to find an idle channel facility among the group of facilities 20,21 . . . 25 and then operates, in quick succession, the select magnet corresponding to that facility and the hold magnet corresponding to its own vertical in the crossbar switch 15. Then the appropriate multifrequency pulse is passed from the transmitter through the service trunk and the crossbar switch 15 to the selected facility. At the same time that the facility is selected, it is of course made busy with respect to further calls from the end of the circuit which has seized it.

The facilities 20, 21 and 25 are a kind of trunk circuit associated with the corresponding channels connecting the horizontals of the crossbar switch 15 with the horizontals of a similar crossbar switch 45 located among the switching equipments of a central office 47 located near the service centers of the telephone company (FIG. 2). These circuits are called facilities rather than trunks to distinguish them from the trunk circuits connected to the verticals of the crossbar switch. There may be many more than 5 channels, as is suggested in FIGS. 1 and 2 by showing two of the intermediate facility circuits in dashed lines, but there will be considerably fewer facility circuits than trunk circuits, the entire purpose of the operation being to assure efficient loading of the relatively expensive long distance channels under various conditions of service traffic.

In addition to the groups of outgoing trunk circuits mentioned above there are trunk circuits for incoming calls each connected to a vertical member of the crossbar switch 15. These may be either incoming trunks or combination incoming and outgoing trunks known as two-way trunks. Separate incoming and outgoing trunks provide better handling of peak loads. In this type of system the need of incoming calls is mainly for incoming trunks with which to reach local numbers by dialing and these are represented by the tie trunks 37 and 38. An incoming call selects an idle member of this group by selection chain circuit 33. The selection chain circuits for selecting an idle outgoing trunk and the one for selecting an idle facility circuit are not specifically shown in FIG. 1 for reasons of simplification.

The multifrequency signal receiver 49 in FIG. 2 is connected to a branch circuit off the talking circuit of each of the facilities 50,51 . . . 55 by the path 56. The multifrequency signal receiver 35 of FIG. 1 is similarly connected by circuit path 36 to the facilities 20,21 . . . 25. There is an amplifier and detector branch on each facility and if a tone pulse is detected by one of them, its facility is connected to the main portion of the receiver, and the facility is made busy during the receiver's operations. The multifrequency signal receiver 49 will promptly decode the pulse and activate one of the selection chain circuits that is designed to seek an idle trunk among a group of incoming trunk circuits having the same service center destination. Following the previous assumption that the call came from the outgoing repair service trunk 10 of FIG. 1, the receiver will activate the selection chain circuit 60 (FIG. 2) which in turn will activate an idle incoming repair trunk, for example the trunk circuit 61. When the latter is connected to the call, (before the called party answers) the multifrequency signal receiver 49 briefly activates reply tone generator 65, which sends a short pulse of reply tone back to the outgoing repair service trunk 10 over the circuit path 56, the selected channel facilities, the crossbar switch 15, and the trunk circuit 10 to the reply tone receiver 39.

If the reply tone does not arrive within a short interval the multifrequency transmitter will be caused to repeat once more the code pulse previously transmitted. The multifrequency transmitter's lockout circuit is released when a pulse of reply tone is received or when the one second or so time for making the connection runs out (presumably because all the trunks of the desired group at the service center are busy). On a call from the service center there is no repeated transmission of the multifrequency signal and failure of reply tone to arrive will result in a prompt application of "-busy" tone.

If a call to the service center is an operator assistance call, the multifrequency signal receiver 49 (FIG. 2), after causing reply tone generator 65 to send a pulse, will activate the selection chain circuit 70 in order to obtain a connection to the toll switchboard 71. Similarly, information calls activate the selection chain circuit 73 to obtain a connection to an information trunk appearing at the information center 74.

The outgoing traffic from service centers over systems according to the invention is in general very much lighter than inward traffic and is likewise not so much differentiated by type of call. There is a need for tie line operations from the test desk to subscriber lines at the outlying office and hence the system will operate in the outgoing direction from the test center in substantially the same manner as was just described for inward calls except for the previously noted different response to the absence of reply tone. The outgoing tie trunk circuit 75 is one of the trunk circuits accessible from the test desk for this traffic. Trunk circuit 82 is, for example, a similar trunk circuit accessible from the toll switchboard. If desired, trunk circuits (not shown) could also be provided for access from the information center 74. The various outgoing trunks at the service center, whatever desk they may serve, would normally all be arranged to connect with the incoming trunk group at the outlying central office containing the trunk circuits 37 and 38, but in the area of some outlying central office there may be some telephone company office or installation requiring a separate trunk or group of trunks (not shown) which could readily be provided.

An important function of the system shown in FIGS. 1 and 2 is the transmission of alarms from the outlying central office to the test center. Since the service center communication system of the present invention is designed to be a heavily loaded system, malfunctions of its important components will be among the more important alarms to be transmitted to the technical service center. The alarm detector 76 (FIG. 1) represents all the various circuits for detecting the various kinds of conditions that register an alarm indication at the central office where the switching equipment 1 is located, including those arising within the communication system here described. It activates an alarm reporting circuit 77 which has the function of being activated by alarm signals derived from the alarm detector 76 to operate a lockout circuit for access to the signal transmitter 34 and then simultaneously to seize an idle facility circuit through the crossbar switch 15 and to cause the transmitter to transmit to that facility circuit a multifrequency pulse having the proper coding for the alarm signal. Since this function is analogous to that of a trunk circuit used on a call and can be performed by similar circuits, though some of the trunk circuit functions are in this case left out, the alarm reporting circuit 77 may be treated as one of the outgoing trunk circuits of the system and may be referred to as an alarm trunk circuit.

The alarm signals to be transmitted are both the initiation and termination of a condition causing an alarm. Some 20 different kinds of alarm conditions may be involved, each with a different code for initiation and for cancellation of the alarm, making a total of 40 codes. 15 different frequencies are commonly provided for m.f. signaling on an ordinary voice channel, of which one is needed for a reply tone, leaving about 100 codes available for a pulse containing three different frequencies, one from each of three frequency ranges (containing 5, 5, and 4 of the frequencies respectively). The number of destinations at the service center's end is relatively limited, so that if 40 three frequency codes are used for alarms the 60 remaining available for other service center destinations would still be more than sufficient. Modifications of the system for handling the larger variety of alarm signals required when many outlying offices are served by the system on a tandem basis are described below in connection with figures 22, 23, 24 and 25.

It may be desirable to use a separate destination code for a check pulse to be sent whenever the multifrequency transmitter and multifrequency receiver have been inactive for more than half a minute, as described below in connection with FIG. 21. Absence of reply tone would register an alarm at the test desk.

The transmission of a single pulse alarm signal proceeds much as in the case of a call, except that the response of the multifrequency signal receiver 49 (FIG. 2) in this case is merely to provide the appropriate actuation at the alarm indicator panel 78 over the path 79 (which must be understood as a cable of many circuits, one or two for each kind of alarm) and sends a pulse of reply tone. No crosspoint is ever closed in the crossbar switch 45 in response to an alarm signal. As soon as the alarm trunk 77 (FIG. 1) receives reply tone, the alarm trunk 77 releases the channel facility which it had seized through the crossbar switch 15 and likewise releases its transmission lockout circuit.

In the case of calls (as distinguished from alarm transmissions) the multifrequency code equipment of the present system serves to set up the requested connections but is not called into play for their disconnections. Disconnection is governed by the conventional provisions for supervision in the outgoing and incoming trunk circuits. Indeed the multifrequency equipment does not even wait for the called party to answer and drops off as soon as, the connection being made, the called party is being summoned by ringing, a switchboard lamp signal, or whatever arrangement is used for the particular call.

When connection is completed as a result of the operation of the system just described, local loop continuity is established, which operates a relay of the incoming trunk circuit, and this in turn provides for causing the reply tone to be transmitted. Arrival of reply tone blocks the operation of a busy tone timer, so that if loop continuity is not detected within a short period, a second or two over-all, then busy tone is applied and is heard by the caller. This timing circuit makes it unnecessary to transmit a busy tone over the system when all the trunks of the group requested (the repair group in this example, which includes trunk 61 of FIG. 2) are busy. The possibility of enabling the caller or the central office equipment to distinguish between a service center busy condition and a transmission or switching failure is not worth the additional complication of providing busy tone generators and receivers comparable to the reply tone generators and receivers, or even combining the two by sending both the reply tone and one additional frequency (which may be among the 14 m.f. signaling frequencies, preferably from the C group described in FIGS. 12 and 13 for signaling a busy condition). The service center itself can obviously record for itself occurrences of all trunks busy conditions at the various service desks, and provisions can be made in a known manner to provide for connecting the first or even the second overflow call to a recording stating the situation instead of relegating the caller to a busy tone. The frequency of connections to such a recording can be used as an overload indicator.

When all the channel facilities are busy, relays are operated to condition each of the service trunk circuits which might attempt to accept an additional call (that is, all of them except those actually busy and loading the channel facilities) so as to return an immediate busy signal to any one attempting to place an additional call over the system. At the same time this condition brings in an alarm which is transmitted to the service center at the first opportunity.

As is described below in more detail, in addition to a relay to respond to the all facilities busy condition, there is connected with the selection chain circuit of the channel facilities a relay that will operate when some predetermined major portion of the facilities are busy, say, two-thirds or three-quarters. When this condition occurs, access to the facilities is denied to all traffic except operator assistance calls and automatic alarms. Trunks serving other traffic are caused to give the calling party an immediate busy tone so long as this major portion facilities busy condition persists. If desired an automatic record of the periods during which this condition takes place can be kept in order to determine the extent of overload of the facilities and to guide administrative personnel in deciding whether to provide additional facilities.

Tie trunk calls from the technical center to outlying central offices require transmission of dial pulses to the outlying central office, so that the caller can get the particular customer station or telephone company business office, or the like, that he may want to reach. Here again, there is no resort to the multifrequency signal generators of the present system and the tie trunk circuits at either end of the system are arranged for "foreign exchange line" service, usually with so-called "E and M" a.c. signals for dial pulse transmission if direct current pulsing is not available, but sometimes with other well known alternatives. In this system, when the tie trunk circuit at the outlying office is seized by the completion of the connection through the system, dial tone is picked up by it and sent to the caller, who then operates his dial or tone caller, in response to which the switching equipment in block 1 in the upper part of FIG. 1 is operated to make the desired outgoing connection.

Figure 3:
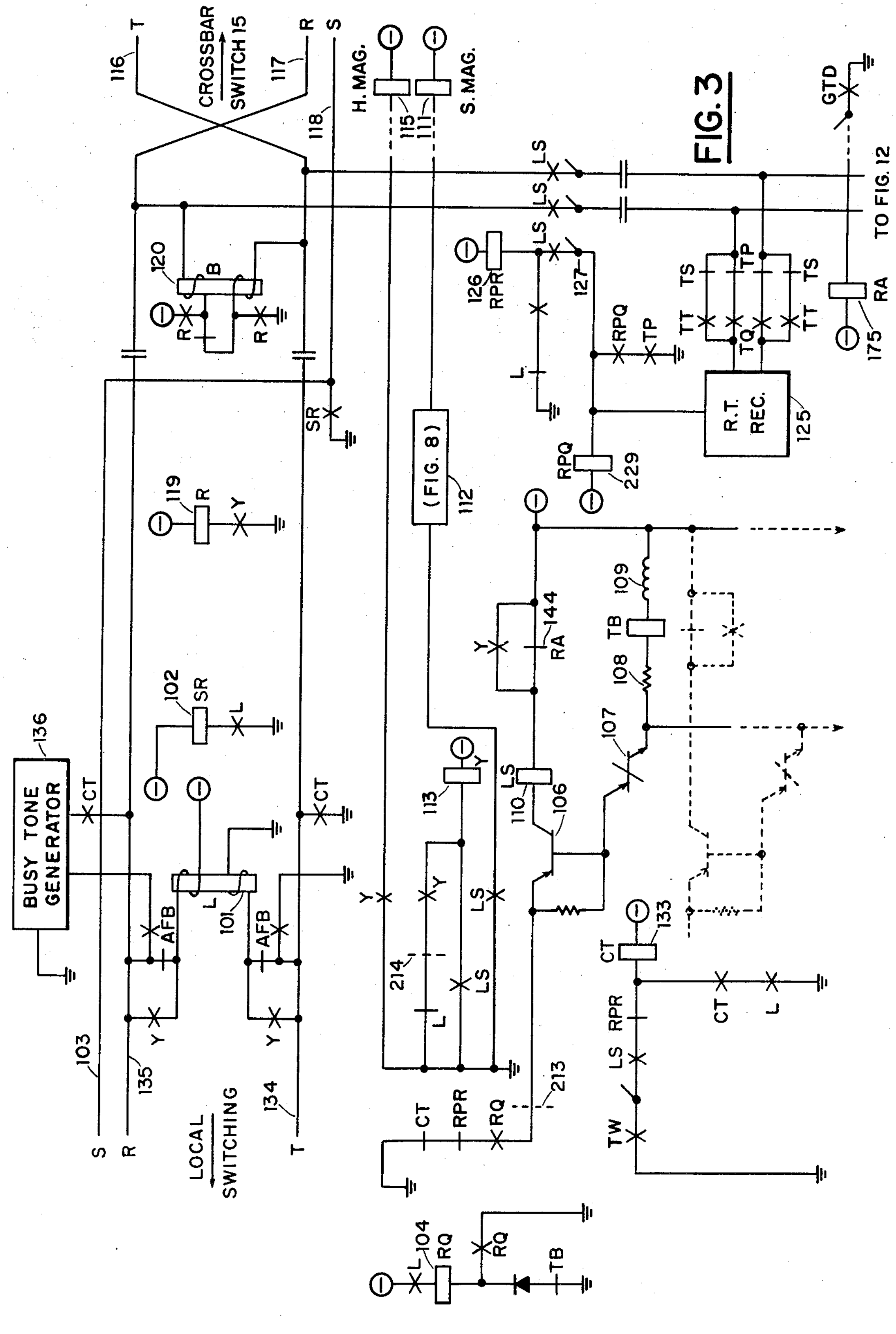
FIG. 3 is a circuit diagram of an outgoing trunk circuit for use in the arrangement shown in FIG. 1 and of its connections with the crossbar switch, the multifrequency transmitter and the reply tone receiver of that arrangement.

FIG. 3 shows in its upper portion an outgoing service trunk circuit such as would be used in FIG. 1 when the circuits linking FIG. 1 and FIG. 2 permit direct current linking of supervisory relays. Some of the auxiliary circuits that are commonly provided in trunk circuits, such as a make busy connection, for example, have been omitted for simplicity. In addition to showing a trunk circuit, FIG. 3 shows a portion of the lockout circuit of the multifrequency transmitter and the connection of the trunk circuit with the magnets of the crossbar switch, with the multifrequency signal generator and with the reply tone receiver.

Where the trunk circuit of FIG. 3 is seized by a call from a subscriber line, L relay 101 operates, operating SR relay 102, which applies ground to sleeve conductor 103, marking the trunk circuit as busy and causing other calls seeking similar service to be diverted to other trunks or, if there are none, to busy tone. L relay 101 also operates RQ relay 104, provided there is then no active circuit in the lockout selector portion of the multifrequency transmitter. If the lockout selector is active, so that the transmitter busy (TB) relay 105 is operated, operation of RQ relay 104 is delayed until TB relay 105 releases. When RQ relay 104 operates it places ground on the emitter electrode of transistor 106 in the lockout circuit serving this particular trunk circuit. This circuit is one of the group of identical lockout circuits serving the various trunk circuits, all of which have their pnpn diodes, such as the diode 107, connected to battery through TB relay 105, which may be in series with additional resistance 108 and inductance 109 (unless the coil of relay 105 has sufficient resistance and inductance for the purpose). Only one of the pnpn diodes will be in its conducting state at a time, so that if because of simultaneously presented requests for service, two or more of these lockout circuits have the emitters of their respective transistors grounded, only one of the relays in the collector circuit of the respective transistors will be operated at a time, but all of the activated ones will be operated in turn, in random order, before TB relay 105 releases.

It is essential that the LS relay of one lockout circuit release a moment before the LS relay of the next circuit served operates, for the benefit of the circuit OF FIG. 9, hereinafter described. On the other hand TB relay 105 must remain operated during that interval whenever the successively operating circuits are members of a group simultaneously activated by their RQ relays. It may be necessary to provide a relay of slow release construction for TB relay 105. Such a slow release relay could, alternatively, be operated by make contacts of the LS relays, if desired, instead of by the pnpn diode current of the lockout circuits. TB relay 105 itself performs a lockout function, sequencing access to the diode-switched lockout circuits. The operation of the pnpn diodes in this type of lockout circuit is more fully described in C.B. Davies U.S. Pat. No. 3,571,530 issued Mar. 16, 1971.

Figure 8:
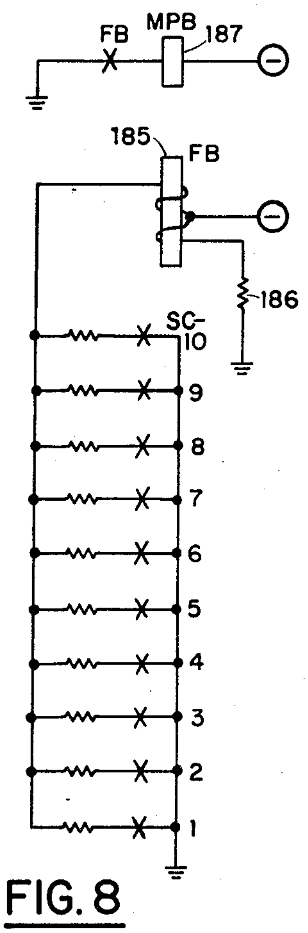
FIG. 8 is a diagram of a circuit for controlling the classes of traffic accepted after a major portion of the facilities are busy.

When the lockout selector (LS) relay 110 operates, it operates the select magnet 111 of an idle channel facility through the selection chain circuit 112, of which a diagram appears in FIG. 8. At the same time, it operates Y relay 113, which locks to the L relay 101, which means that it stays in until the calling party hangs up. The Y relay 113 operates hold magnet 115 of the crossbar switch vertical corresponding to the trunk circuit shown in FIG. 3, thereby closing the crossbar switch 15 to connect the selected channel facility with T,R and S conductors 116, 117 and 118 of the trunk circuit. Operation of the Y relay 113 prevents subsequent operation of the multifrequency receiver from interrupting the operating path of LS relay 110 by means of RA relay 175. The Y relay 113 also operates the R relay 119 (in the trunk circuit) which applies battery and ground to the talking circuit.

Figure 9:
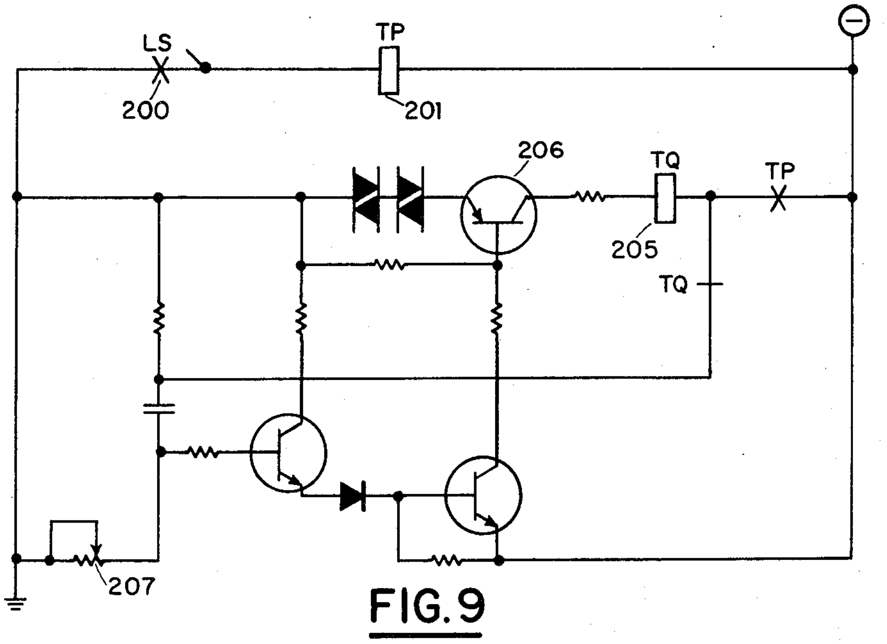
FIG. 9 is a diagram of a transmitter timing circuit for the service center multifrequency transmitter in the system of FIG. 2.
Figures 10, 11, 12:
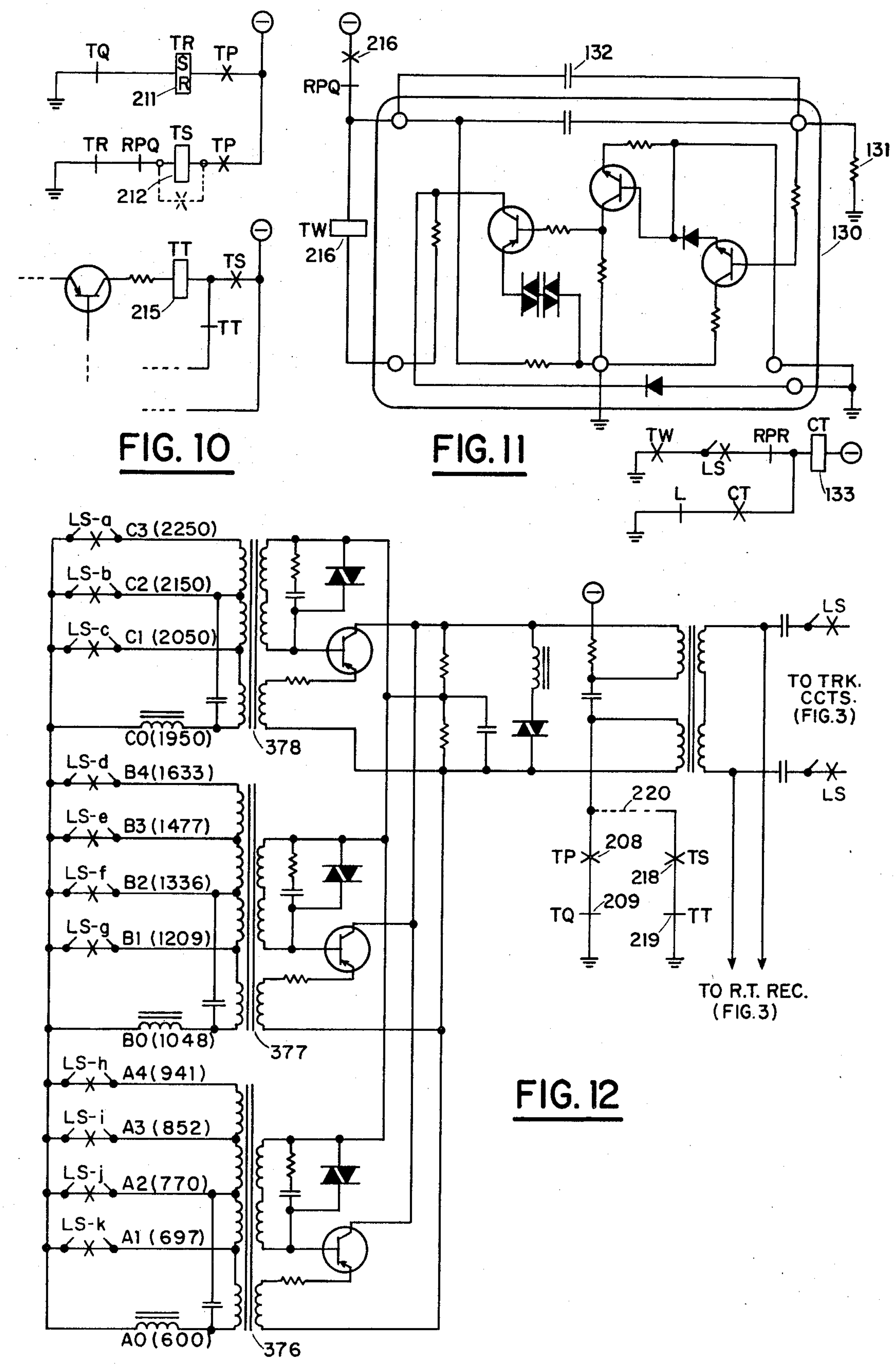
FIG. 10 is a partial diagram of an addition for use in combination with the circuit of FIG. 9 in the transmitter timing circuit at the outlying central office (FIG. 1)
FIG. 11 is a diagram of a timing circuit for use in combination with the circuits of FIG. 9 or FIG. 10 for timing out an unsuccessful operation.
FIG. 12 is a diagram of the circuit of the multifrequency signal generator used in the signal transmitter of FIGS. 1 and 2.

As shown in FIGS. 9 and 12, the operation of LS relay 110 also initiates the energization of the transmitter timing circuit (FIG. 9) and sets up the code of the multifrequency generator of the transmitter (FIG. 12). The successful transmission of a pulse by the multifrequency transmitter is followed by reception of reply tone by reply tone receiver 125, the circuit of which is preferably the same as that of FIG. 10 of C.R. Davies U.S. Pat. No. 3,571,530 the only difference being that (1) in this case the circuit is continuously operating while the system is functioning and (2) instead of the S relay of the Davies patent, the circuit operates RPR relay 126, the connection between reply tone receiver 125 and RPR relay 126 being effected through a make contact of LS relay 110. The branching indication 127 indicates that reply tone receiver 125 is similarly connected to the RPR relays of other trunk circuits through contacts of the corresponding LS relays. When RPR relay 126 operates it locks itself to L relay 101. As shown in FIG. 3, operation of RPR relay breaks the lockout circuit, releasing LS relay 110 and allowing another trunk to be served.

RPQ relay 229, also operated by reply tone receiver 125, is used for operations not limited to particular trunk circuits, particularly in the timing circuit shown in FIG 11, described further below, where it is able to block the timing out operation which would occur if no reply tone is received shortly after the repeated operation of the multifrequency transmitter (the repeated operation would not have taken place if a reply tone had been received after the first pulse). At the service center of course, the timer is activated after a single pulse transmission. When the timing out cycle goes to completion, CT relay 133 operates and locks itself to L relay 101 and applies busy tone across T and R conductors 134 and 135 from busy tone generator 136, thus making it necessary for the calling party to hang up. It also breaks the operating path of LS relay 110, releasing the lockout circuit.

In the case of alarm signals (i.e., in the functioning of alarm trunk circuit 77 of FIG. 1), there being no L relay, because there is no call to follow the operation of the signaling equipment of the invention, the locking path of Y relay 113 is omitted. The Y relay will then release upon release of the LS relay and the latter will release upon operation of the RPR relay. The latter will not need the locking path of RPR relay 126 and likewise the CT relay will not need the locking path of CT relay 133. If, moreover, for failure of a reply tone to be received the CT relay of an alarm trunk circuit operates, it is necessary to provide for repeating the alarm signal, preferably once right away and thereafter every few minutes until reply tone reception again occurs. Circuits for obtaining such operation and registering a further alarm are disclosed in FIG. 22 in connection with a more elaborate alarm transmission system. It will be understood that various features of that system may be used in combination with simpler alarm transmission arrangements of this invention.

If there is no idle facility to be seized by operation of LS relay 110, the all facilities busy (AFB) relay 145 (FIG. 7) will have been operated at the time the last available channel facility was made busy and, as shown in FIG. 3, would have broken the operating path of L relay 101 at that time and applied busy tone to the talking circuit. The trunk circuits which are using the busy channels in question are prevented from having busy tone applied on them by the bypasses around the break contacts of AFB relay 145 which are provided by make contacts of Y relay 113.

Obviously only one AFB relay is needed for the system, but it must operate two sets of transfer contacts in every trunk circuit. Hence, it may be desirable for a master AFB relay to operate slave relays in the trunk circuits. In general, where one relay is shown which is required to operate a large number of contacts it is to be understood that an equivalent group of relays may desirably be used if the same function may be better accomplished by a group of relays.

It is to be further understood that in many cases solid state circuits may be substituted in a known manner for particular relay functions or for relay circuits.

Figures 4, 5:
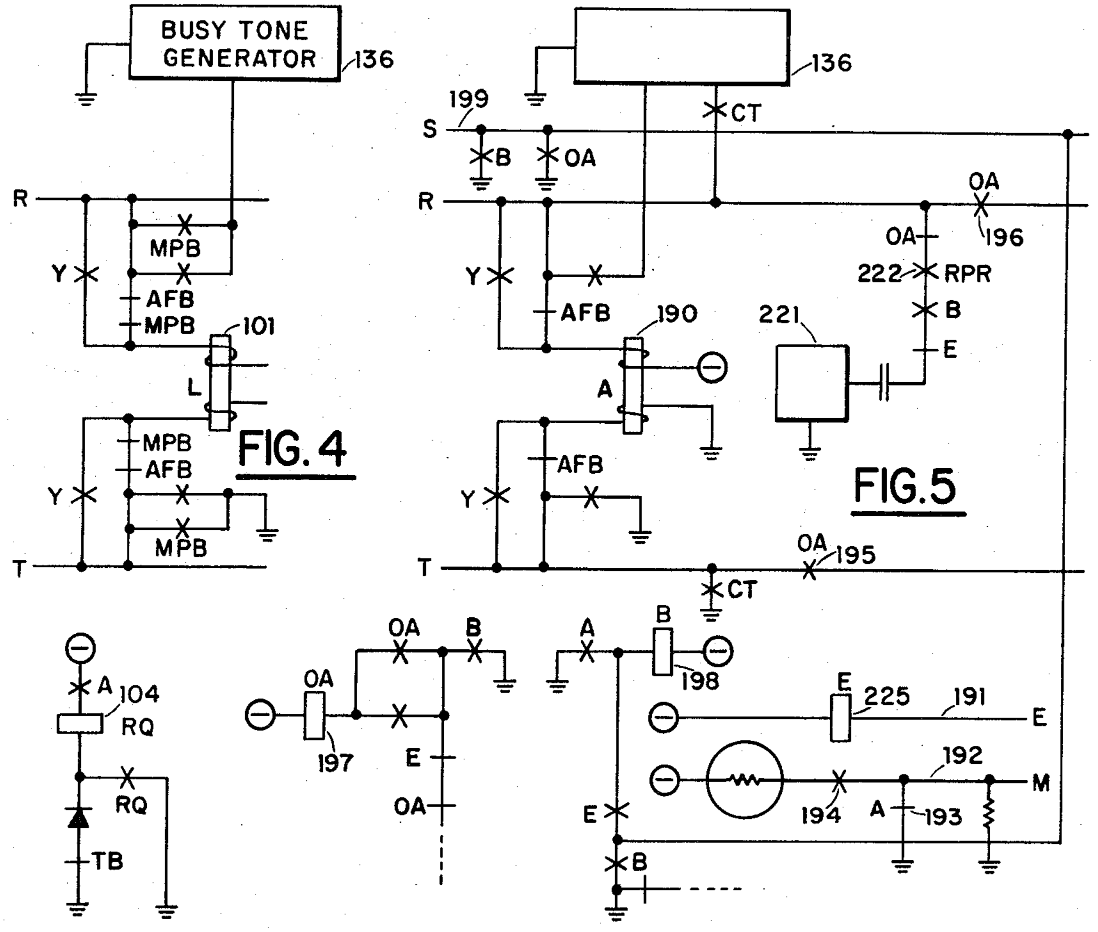
FIG. 4 is a modification of a portion of FIG. 3 for use when the circuit of FIG. 9 is used.
FIG. 5 is a diagram of an outgoing trunk circuit that may be substituted for part of the circuits of FIG. 3.

FIG. 4 shows a modification of the circuits associated with the operating path of L relay 101 of FIG. 3 when the circuit of FIG. 9 is used to provide a relay which operates when a major proportion of the channel facilities are busy. The circuit of FIG. 4 is then used on those trunks to which it is desired to deny service so long as a major proportion of the channel facilities are busy.

In FIG. 3, circuits of the invention are shown associated with an outgoing trunk circuit of the type used where direct current flowing in the talking path operates the supervisory relays. In that case, for example, B relays 120 does not operate when there is a high resistance closure of the talking loop, such as occurs when an incoming trunk is seized at the service center, but operates only when an operator at the service center answers the call, providing a low resistance closure of the loop through the operator's telephone set. The particular scheme operation of the various supervisory relays is of at most incidental importance to the circuits of the present invention. For example, B relay 120 only operates after the circuits of the invention have done their job and have separated themselves from the call. On the other hand, the relay that operates at the service center when the incoming trunk is seized is important, because this must operate before the reply tone generator 65 (FIG. 2) is activated, a function which will be more particularly described below in connection with the multifrequency signal receiver.

Where the distances between the crossbar switches 15 and 45 of FIGS. 1 and 2 are too long for direct current supervision circuits, and particularly where many channels are provided on a single conductor pair by means of carrier current techniques, signaling equipment is provided at the two ends of the route for transmitting and receiving alternating current signals for controlling the supervisory relays, as is well understood. FIG. 5 shows an outgoing trunk circuit of one kind that uses signaling equipment of the kind just mentioned, as this trunk might be used in the arrangement of FIG. 1.

When the trunk circuit shown in FIG. 5 is seized by a call which is to be connected to the service center, the A relay 190 is operated as the result of the talking loop being closed through the calling party's telephone. The A relay 190 is accordingly the equivalent in this type of trunk circuit for the L relay 101 of FIG. 3 and it is likewise provided with provisions for interrupting its operating path during all-facilities-busy conditions unless it happens to be using one of the busy facilities at the time the condition arises.

The signaling unit (not shown) for operating supervisory relays at the other end of the route is controlled by E lead 191 and M lead 192. Transfer contacts 193 and 194 of A relay 190 remove a ground connection from M lead 192 when A relay 190 operates and also apply battery potential instead. This condition causes the signaling unit (not shown) to send a signal to the trunk circuit at the other end of the route. This is done by connections (not shown) over that portion of the talking path which is still not accessible to the calling party for talking because contacts 195 and 196 have not yet been closed by OA relay 197. Operation of A relay 190 causes B relay 198 to operate shortly afterwards, grounding sleeve conductor 199 and applying audible ringing tone from the generator 221 to notify the calling party that the called party is being summoned. When this type of trunk circuit is used in a system according to this invention, this particular function could well be postponed until RPR relay 126 has operated and accordingly contacts 222 may be provided for that purpose. If this signaling nicety is not worth the cost, these contacts should be omitted. When the operator answers at the service center, the trunk circuit at the service center is caused to activate its signaling unit so that the signaling unit (not shown) associated with the trunk shown in FIG. 5 will apply ground to E lead 191, operating E relay 225, which in turn operates OA relay 197 and also interrupts the path through which audible ringing tone was being supplied.

OA relay 197 locks itself to B relay 198, so that it is no longer dependent on the operation of E relay 225 (which will drop out when the called party disconnects) and completes the talking path at its previously mentioned contacts 195 and 196.

RQ relay 104 is in this case controlled by a make contact of A relay 190. It should be mentioned, however, that in FIG. 3 RQ relay 104 could just as well have been controlled by a make contact of SR relay 102 and that in the case of FIG. 5, RQ relay 104 can just as well be controlled by a make contact of B relay 198. Similarly, the various relays that are shown in FIG. 3 as locking themselves to L relay 101 could instead be locked to SR relay 102. The question is one of where it is most convenient to provide the various contacts needed for the function described in connection with FIG. 3 and of course there is always the possibility that it may be found more convenient to provide one or more additional relays operated by L relay 101 or by A relay 190, as the case may be, to obtain the contacts necessary to operate the various functions.

It will be understood, then, that the circuits involving RQ relay 104, LS relay 110, Y relay 113, RPR relay 126, CT relay 133 and RA relay 175, as well as select magnet 111 and hold magnet 115, can be used as well with a trunk circuit of the type shown in FIG. 5 as with the trunk circuit of the type shown in FIG. 3 and indeed with many other types of outgoing or two-way trunk circuits used at telephone central offices.

Figure 6:
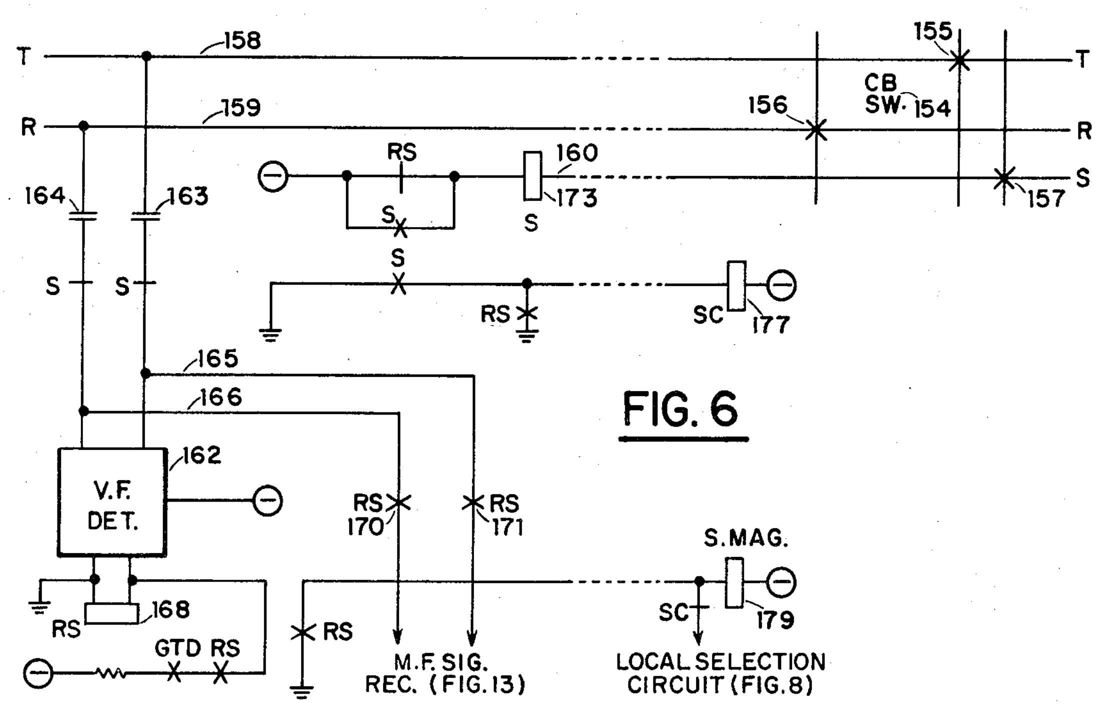
FIG. 6 is a circuit diagram of a channel facility trunk circuit usable in the arrangement of FIG. 1 and in the arrangement of FIG. 2.

FIG. 6 shows a channel facility circuit, such as may be used for the facility circuits 20, 21 . . . 25 in FIG. 1 and the facility circuits 50,51 . . . 55 of FIG. 2. The facility circuit contains a voice frequency detector unit 162 which has its input connected to T and R conductors 158 and 159 of the facility through coupling capacitors 163 and 164. The input provided to the voice frequency detector 162 is also branched through conductors 165 and 166, which are controlled by make contacts of the remote select (RS) relay 168, to provide an input to the multifrequency signal receiver shown in FIG. 13 during these periods for which RS relay 168 is operated. The latter is caused to operate promptly upon detection of a signal. As described below in connection with FIG. 13, the multifrequency signal receiver has a gate (GT) relay 240 which operates promptly under receipt of every multifrequency code signal and this in turn operates GTD relay 243, which remains operated after the end of the code pulse for a period sufficient for the receiver to complete its function and be ready for another operation. Once RS relay 168 has operated, and has caused the incoming pulse to be furnished to the receiver by its contacts 170 and 171, if the signal was a multifrequency code signal, RS relay 168 will lock itself operated to GTD relay 243 of the receiver to keep the path open for the period of receiver operation (including the reply tone transmission interval).

Figure 20:
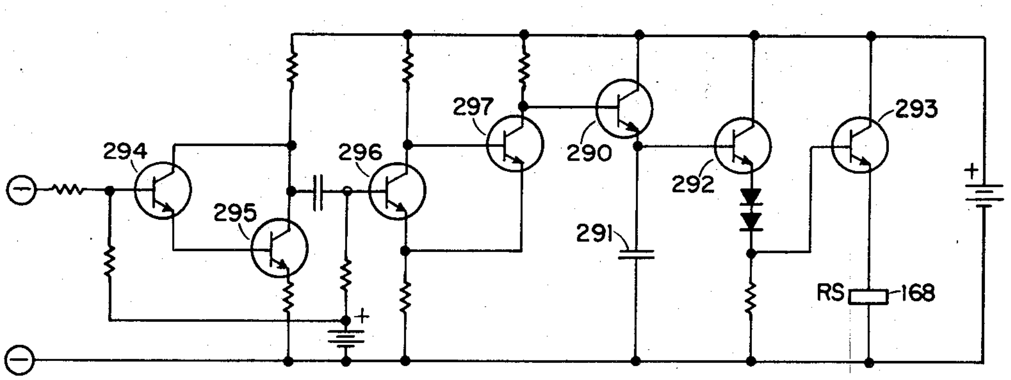
FIG. 20 is a diagram of a voice frequency detector circuit for use in the circuit of FIG. 7.

A preferred circuit for the voice frequency detector 162 is FIG. 10 of the aforesaid C.R. Davies U.S. Pat. No. 3,571,530 with a resistance of high or moderate value preferably bypassed by a small capacitor, substituted for the resonant circuit 512 shown therein. An alternative circuit for this detector is shown in FIG. 20. Many other different kinds of sensitive audio detectors of more conventional design may be used.

During the operation of the multifrequency signal receiver 49, the connection to be set up must also be protected against a call the other way attempting to operate the crossbar switch 47, regardless to which facility circuit the importunate connection attempt might be made. This protection is more efficiently provided by GTD relay 243 of the receiver (FIG. 14) than by RS relay 168 and accordingly it is the former that operates an RA relay in every outgoing trunk circuit, corresponding to RA relay 175 of FIG. 3. RA relay 175 defers the operation of LS relay 110 unless Y relay 113 was already in operated condition when RA relay 175 operated. At the service center the corresponding operation of RA relays of outgoing trunk circuits is not strictly necessary when the receiver 49 is receiving an alarm signal and not trying to set up a crossbar switch connection. A contact (not shown) of AM relay 146 (FIG. 19) could accordingly be used to prevent the RA relays from operating in such case.

RS relay 168 also operates select magnet 179 of the crossbar switch 154 and keeps it operated until the circuits activated by the receiver have had a chance to operate a hold magnet to close a crosspoint in the crossbar switch 154, after which it is no longer necessary to furnish current to the select magnet 179. The switch 154 represents either crossbar switch 15 of FIG. 1 or crossbar switch 45 of FIG. 2, as the case may be.

If, now, the call being connected over the facility shown in FIG. 6 is not directed towards the location of the crossbar switch 154 but rather in the direction from that location towards the other end (towards the left on FIG. 6, that is) if RS relay 168 is unoperated when the facility is seized by the local transmitter, S relay 173 is promptly operated when ground is applied to it by the closing of contacts 157 of the crosspoint in question of crossbar switch 154. The S relay in operating causes SC relay 177 to operate, marking this facility busy. The closing of the crossbar switch crosspoint results from LS relay 110 having operated select magnet 111 and Y relay 113 having operated hold magnet 115, as described in connection with FIG. 3.

Figure 7:
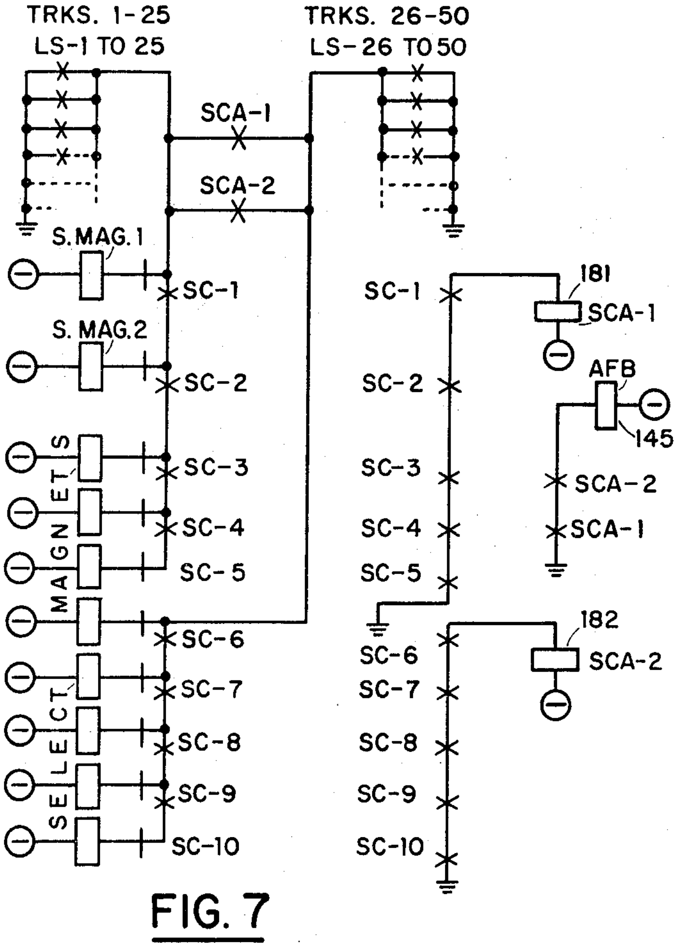
FIG. 7 is a diagram of the selection chain circuit through which are operated the select magnets of the crossbar switch at the end of the system at which a call originates.

FIG. 7 shows how the select magnets which operate the horizontal elements of the crossbar switch are connected in a chain selection circuit so that new calls pass over the busy facilities and operate the next idle facility in a predetermined sequence. In order not to over-use those elements of the crossbar switch and of the associated channel facilities which are ranked first in the sequence, the facilities are split into two groups (and of course larger more complicated groupings are also possible) each of which provides first choice service for half of the service trunks that may require a connection, the service trunks being represented by the contacts of their respective LS relays, which as described in FIG. 3 operate a select magnet of the facility to be selected. When all the facilities of one of these two groups are busy, which means that their selection chain (SC) relays are all operated (cf. SC relay 177 of FIG. 6), and SCA relay operates and makes the other group of facilities available, by connecting the two groups together at the input of the two chains. Thus as shown in the right-hand portion of FIG. 7, when the SC relays of the first group are operated SCA-1 relay 181 operates and when all the SC relays of the other group are operated, SCA-2 relay 182 is operated. When both SCA relays are operated, which means that all of the facilities are busy, AFB relay 145 operates, with the consequences previously described in connection with FIG. 3.

The selection chain circuits for the facilities of FIG. 1 and those for the facilities of FIG. 2 should be so arranged that those facilities which are selected last at the outlying central office are selected first at the service center and vice versa. Then during light traffic and during conditions when traffic from one end is light even though the other end furnishes moderate to heavy traffic, the chances of the same facility being seized simultaneously from both ends are greatly reduced.

FIG. 8 shows a simple way of detecting the condition in which so great a proportion of the facilities are busy that the consequences described in connection with FIG. 4 should result. In this case, each operated SC relay puts a certain amount of current through the facilities busy (FB) relay 185. The latter is designed or arranged to operate only after the current through it reaches a certain threshold value corresponding to the appropriate number of operated SC relays, regardless of which ones they might be. One way of arranging such a relay is, as shown in FIG. 8, to use a polar relay with a bias winding in which flows an amount of current controlled by the value of resistor 186 sufficient to balance out the effect of the current put through the relay 185 be a predetermined number of closed SC relays. When there are very many facilities, the current steps will be relatively small and the operation of FB relay 185 may not always be upon the making busy of precisely the same number of facilities, but the larger the number of facilities the less important it is whether that number is always precisely the same, so in any case, some simple kind of marginal relay is adequate for the purpose. Polar relays are not usually made in a way suitable for operating a large number of circuits and hence the operation of FB relay 185 is repeated by MPB relay 187, and since the latter must operate contacts in a large number of trunk circuits (not as many are affected by AFB relay 145), it is to be understood that instead of one relay with contacts wired to a lot of different trunk circuits, there may be a group of relays, as was mentioned in connection with AFB relay 145.

FIG. 9 shows the transmitter timing circuit. Make contact 200 of LS relay 110 causes the transmitter pulse (TP) relay 201 to operate. TP relay 201 prepares the operating path of TQ relay 205, which is in the collector circuit of transistor 206, which is connected in a timing circuit of the type described in FIG. 6 of C.R. Davies U.S. Pat. No. 3,571,530. At the end of an appropriate pulse interval determined by the adjustment of resistor 207, TQ relay 205 operates. As shown in the upper righthand portion of FIG. 12, the multifrequency generator of the signaling transmitter is keyed on for that period during which TP relay 201 is operated while TQ relay 205 is not yet operated, that being effected by contacts 208 and 209 shown in FIG. 12.

As shown in FIG. 10, TP relay 201 in operating causes slow release TR relay 211 to operate and at the end of the transmitter pulse, TQ relay 205 breaks the operating path of TR relay 211. The release time of TR relay 211 provides an interval for the reception of a reply tone from the other terminal of the system. It is to be understood that instead of a slow release relay, an equivalent solid state timer could be used.

TP relay 201 in operating also prepares the operating path for TS relay 212, but the simultaneous operation of TR relay 211 prevents TS relay 212 from operating at that time. If before the operation of TS relay 212 a reply tone is received by receiver 125, RPQ relay 229 operates as described in connection with FIG. 3 and locks to TP relay 201. As shown in FIG. 10, the operation of RPQ relay 229 prevents TS relay 212 from operating.

If the reply tone does not arrive during the period allowed for its reception, as mentioned previously the transmitter at the outlying central office is caused to repeat its signal pulse. That operation is effected, as shown in FIG. 10, by TS relay 212 closing the operating path of TT relay 215, which is connected to a timing circuit which is the duplicate of that in which TQ relay 205 is connected (hence only a portion of that timing circuit is shown in FIG. 10).

FIG. 11 shows the timing circuit used to time the period for the arrival of the final reply tone pulse if one did not arrive after the first pulse. At the service center this circuit is preferably used instead of the TR and TS relays 211 and 212. Contact 216 is a contact of TQ relay 205 at the service center but is a contact of TT relay 215 at the outlying central office. Timer 130 is a widely used type of semiconductor timer that need not be further described, so well is it known. Its period is adjustable by varying the magnitude of resistor 131 or capacitor 132, or both. At the end of the timed period TW relay 216 operates. The latter, through a make contact of the active LS relay (e.g. 110) and a break contact of the corresponding RPR relay (e.g. 126), operates a connection timing relay, such as CT relay 133, with consequences already described in connection with FIG. 3.

A possible reason for the failure of reply tone to arrive, not usually as likely as the possibility of all trunks at a service position being busy, is that the same channel facilities were seized at both ends for sending a pulse to the other end, in each case cutting off the receiver before the arrival of the pulse from the other end. Obviously, in this case one end must be caused to release the facility. Since the service center is likely to have the lighter outgoing traffic its circuits are made to release the lockout selector circuit end also Y relay 113 (by contact 214, FIG. 3, operated by CT relay 133), hold magnet 115, select magnet 111 and the corresponding relay of selection chain circuit 112 (FIG. 3), as well as the transmitter timing relays (FIG. 9). Since CT relay 133 locks to L relay 101 (FIG. 3) or A relay 190 (FIG. 5) (actually at the service center to some equivalent relay), and applies busy tone, the calling party will have to hang up and try again. For outgoing service center calls, an occasional immediate "false" busy tone in case of simultaneous seizure of the system from both ends will create no problem, although that would be hardly tolerable for calls to the service center, which may be from any customer. If desired, however, two timing circuits could be used, one (not shown) to open contacts 214 long enough to release the lockout circuits and permit the incoming call to operate GTD relay 243 in the receiver, and a second timer (130 of FIG. 11) of slightly longer period to operate CT relay 133.

The circuit of the multifrequency generator of each signaling transmitter is shown in FIG. 12. The provision for keying a second pulse through a make contact 218 of TS relay 212 and a break contact 219 of TT relay 215 is shown connected to the rest of the circuit by a dashed line 220, to indicate that this provision is made only at the outlying central office and not at the service center, for the reasons previously mentioned. The multifrequency generator circuit shown in FIG. 12 is of the type shown in FIG. 9 of the aforesaid C.R. Davies patent and hence does not need further description. The various LS relays of the respective lockout selector circuits operate one contact of each of the three oscillator tuning circuits shown in FIG. 12 except in the case where the required code is the frequency for which no contact should be closed in the particular tuned circuit (i.e., the AO, BO, or CO frequency). Of course each LS relay sets up a different three frequency code when it operates.

Figure 13:
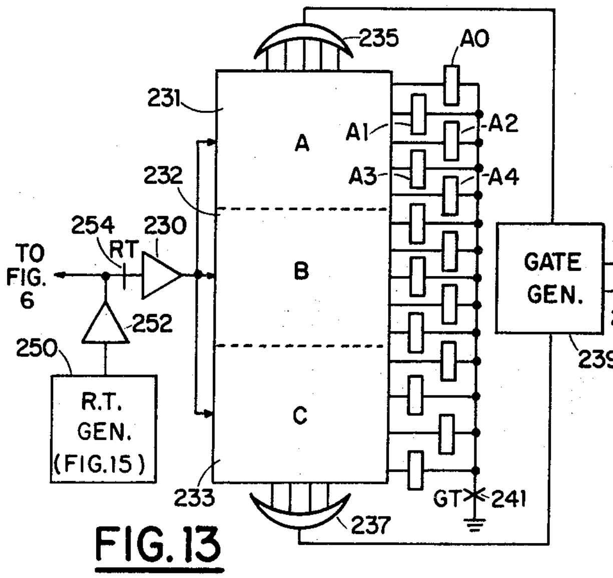
FIG. 13 is a block diagram of the multifrequency signal receiver used in the arrangements of FIG. 1 and FIG. 2.

FIG. 13 is a block diagram of the multifrequency receiver (35 in FIG. 1 and 49 in FIG. 2). It represents a receiver of the type shown in FIG. 16 of the aforesaid C.R. Davies patent, with further description in FIGS. 15, 16, and 17 of that patent. It includes a preamplifier 230 (FIG. 15 of said Davies patent) the output of which is fed in parallel to three channels of frequency ranges respectively corresponding to the frequency ranges of the three oscillators shown in FIG. 12 and hence designated A, B, C, in FIG. 13. The A channel portion of the receiver, shown at 231, determines at which of its possible frequencies the corresponding oscillator of the transmitter operated to produce the pulse being received and accordingly causes one of the code element relays A0, A1, A2, A3 and A4 to operate. B channel 232 and C channel 233 operate in the same fashion with respect to the other two frequency ranges. An OR gate 235 is connected to A channel 231 and an OR gate 237 is connected to C channel 233 in the same manner as the gates 638 and 639 are connected in FIG. 16 of the aforesaid Davies patent, and for the same purpose. The presence in the receiver of FIG. 13 of a multifrequency tone produced by the generator shown in FIG. 12 will cause both of the OR gates 235 and 237 to provide an input to gate generator 239, which is of the kind shown in FIG. 17 of the aforesaid Davies patent and hence will cause GT relay 240 to operate when gates 235 and 237 simultaneously provide an output signal. None of the code element relays A0, A1, A2 . . . will operate unless the received pulse is such as to cause operation of GT relay 240, this requirement being imposed by the contact 241.

In response to receipt of a multifrequency code signal, GT relay 240 operates GTD relay 243, the function of which is to hold the receiver connected to the facility from which it has received the multifrequency pulse in question for a long enough period to include the sending of a reply tone and the completion of the desired connection if an idle trunk is available in the desired group. The receiver must obviously not start responding to another tone and activating another code recognition relay until the receiver relays selected by the previous signal have been released and are ready for another selection. The interval involved is not very long, about a second or so and is determined by TM relay 244 and timer 245.

GTD relay 243 also prepares a bath for operation of the reply tone (RT) relay 246. Contact 249 in the operating path of RT relay 246 is a contact of the SZ relay 290 that responds to seizure of the desired trunk circuit in the manner shown in FIG. 19 and described below. RT relay 246 does not operate, however, until GT relay 240 releases (since the receiver pulse must end before the reply tone begins) and remains operated only until TN relay 248 is operated by timer 247. When TM relay 244 operates, it stays operated only long enough for the release of GTD relay 243, which resets both timers. Both timers are of the same type as timer 130 of FIG. 11.

Figure 15:
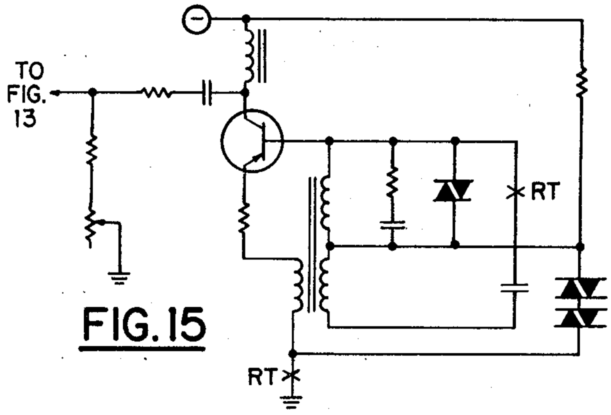
FIG. 15 is a diagram of a reply tone generator for use in the arrangements of FIG. 1 and of FIG. 2.

As shown in FIG. 15, RT relay 246 while operated energizes the reply tone generator. FIG. 15 shows the circuit of the reply tone generator which, being the same as the oscillator shown in FIG. 18 of the aforesaid C.R. Davies patent needs no further explanation. As shown in FIG. 13, the reply tone generator 250 is coupled, through an amplifier 252 to the conductor path between the facilities circuit of FIG. 6 and the preamplifier 230 that feeds the following portions of the receiver shown in FIG. 13. As shown by contacts 254, RT relay 246 breaks the input to preamplifier 230 during the operation of reply tone generator 250, to prevent any portion of the multifrequency receiver from being overloaded. When the tones of the multifrequency pulse transmission system are those indicated in parentheses in the left-hand portion of FIG. 12, it is convenient to use a frequency of 1017 herz for the reply tone generator 250 shown in FIGS. 13 and 15, but of course, the frequency assignments here given are simply for purposes of illustration and various other audio frequency assignments could be used instead for the multifrequency tones and for the reply tone.

Figure 16:
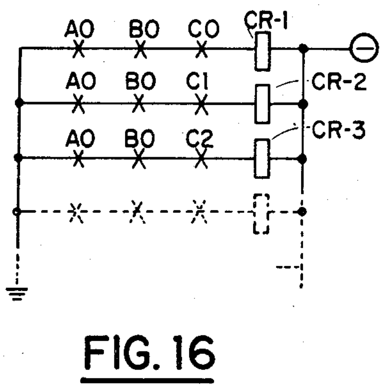
FIG. 16 is a partial diagram of the circuits of the code recognition relays operated by the multifrequency receiver shown in FIG. 13.

The relays shown in FIG. 13 at the right of the A, B, and C channels of the multifrequency receiver, designated with the same symbols are those associated with the tones generated by the multifrequency generator of FIG. 12 (i.e., A0, A1, A2 . . . ) may be referred to collectively as code element relays. FIG. 16 shows how the contacts of the code element relays are arranged to operate one code recognition (CR) relay for each available combination of operated code element relays comprising one code element relay responding to the A channel of the receiver, one responding to the B channel and one responding to the C channel. Since there are five of the first, five of the second and four of the third, there are 100 recognizable codes, but if not all of them are needed, for a particular system, code recognition relays need be provided only for the codes used in the particular system. FIG. 16 shows only the operating circuit of only a few of these code recognition relays, but it will be understood that the others are correspondingly connected.

Figure 17:
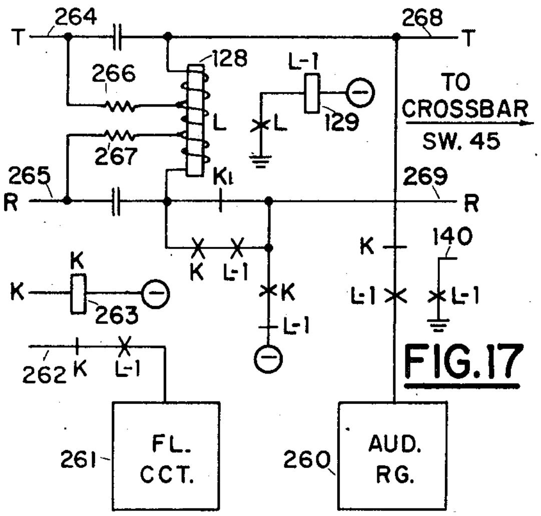
FIGS. 17 and 18 are diagrams of incoming trunk circuits for use in the system of FIG. 2.

The activation of the function called for the received code is normally the completion of the requested connection to a suitable service center trunk circuit, which would close a crosspoint of crossbar switch 45 (FIG. 2) by operating the hold magnet controlled by the selected trunk and applying ground to S relay 173 (FIG. 6) to hold SC relay 177 operated after RS relay 168 releases. Before considering the operations controlled by CR relay 255 shown in FIG. 19, however, some remarks regarding the incoming trunk circuits, particularly as they would be constituted at the service center, may be appropriate. FIG. 17 shows an incoming trunk circuit in which supervisory relays respond to direct current flow established around the loop which includes the crossbar switches 15 and 45 and the selected channel connecting the latter. When the trunk circuit of FIG. 17 becomes connected through the crossbar switch 45 to a channel facility already selected by the incoming call, current applied through the windings of B relay 120 (FIG. 3) at the outlying central office will flow through L relay 128 of the incoming trunk circuit, but because the central part of the winding of L relay 128 has a high resistance, B relay 120 will not operate, although L relay 128 will operate, causing L-1 relay 129 to operate. The latter causes audible ringing to be applied to a trunk circuit from generator 260 and a flashing illumination to be applied from a flasher circuit 261 over conductor 262 to a switchboard lamp (not shown). When an operator answers the call, either by putting a plug in a jack (not shown) or operating a key (not shown) K relay 263 operates, cutting off the audible ringing and the flasher circuit. At the same time the connection of a telephone set between T conductor 264 and R conductor 265, bypassing the high resistance portion of L relay 128 through a path which includes low resistances 266 and 267 as well as the resistance of the telephone set, permits sufficient current to flow between T conductor 268 and R conductor 269 to cause B relay 120 to operate in the outgoing trunk circuit at the outlying central office (FIG. 3). For the purposes of this invention L-2 relay 129 is caused to apply ground to conductor 140, the function of which will be explained in connection with FIG. 19.

Figure 18:
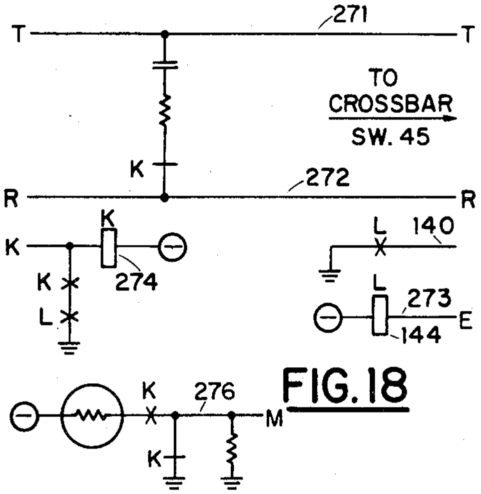

FIG. 18 shows an incoming trunk circuit where the supervisory relays are operated by a signaling circuit as described in connection with FIG. 5 (which shows the type of outgoing trunk that would be used at the outlying central office to work into incoming trunks at the service center of the type shown in FIG. 18). In this case, the signaling unit (not shown) which is connected to T conductor 271 and R conductor 272 near where they are connected to the corresponding verticals of the crossbar switch 45, applies ground to the E lead 273 to operate L relay 144 which has a function corresponding to that of L-1 relay 129 of FIG. 17, and accordingly applies ground to conductor 140 for the purposes explained in connection with FIG. 19. K relay 274 corresponds to K relay 263 of FIG. 17. The arrangements for audible ringing and for flashing a switchboard lamp are omitted for simplicity. When the operator answers and causes K relay 274 to operate, ground is removed and battery is applied to the M lead 276 to the signaling unit (not shown) so that the necessary operation of a supervisory relay at the outlying central office (operation of E relay 225 in FIG. 5) can take place.

Figure 19:
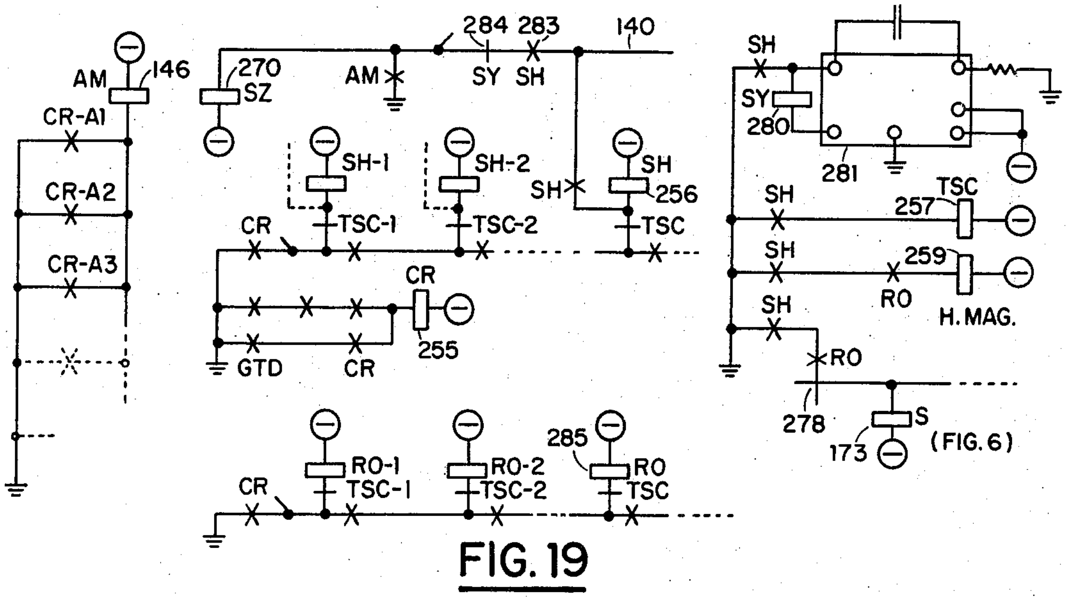
FIG. 19 is a diagram of circuits adapted to be activated by the code recognition relays of FIG. 16.

Incoming trunk circuits at the service center and at the outlying office may be of various specific types, but in any case a contact may be readily provided, if it is not already available, to apply ground to conductor 140 when the talking path is completed without waiting for the call to be answered. There will usually be many trucks to the desired service center destination and likewise at the outlying central office many equivalent available trunks usable for establishing connections through the outlying central office to desired destinations. The selection of an idle trunk circuit associated with the destination identified by a particular CR relay is done through a selection chain circuit similar to, but simpler than, that of FIG. 6. As shown in FIG. 19, CR relay 255 operates a seize and hold (SH) relay through a chain of transfer contacts of the trunk selection chain (TSC) relays, causing ground to be applied to the first available unoperated SH relay, in this case SH relay 256, causing that relay to be operated. The latter causes TSC relay 25 to operate so that the next call to this trunk circuit group will go on to the next SH relay if all the earlier ones in the chain are busy. SH relay 256 also causes hold magnet 259 of crossbar switch 45 to operate and applies ground through the "sleeve" crosspoint 278 of crossbar switch 45 to provide a holding circuit for operated S relay 173 (FIG. 6). SH relay 256 must remain operated long enough to pick up the ground applied to conductor 140 by the supervisory relay of a trunk circuit (FIG. 17 or FIG. 18) to complete its locking circuit but this is assured by the fact that CR relay 255 has locked, in operating, to GTD relay 243.

SH relay 256 also causes SY relay 280 to operate a short period thereafter for the purpose of releasing SZ relay 270, which operates on the ground connection through conductor 140. Preferably a semiconductor timer 281 of the type previously described is used to time SY relay 280 rather than an electromagnetic slow-operate construction for SY relay 280. The timing interval in this case must cover the period during which the reply tone is sent.

Figure 14:
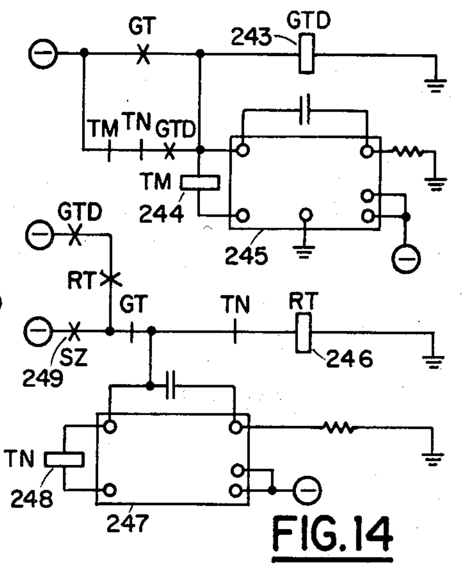
FIG. 14 is a diagram of timing circuits for the multifrequency signal receiver and the reply tone generator.

SZ relay 270 in operating satisfies a condition necessary for the activation of the reply tone generator 250, as explained in connection with FIG. 14. The contacts 283 of SH relay 256 are not strictly necessary but by disconnecting the conductors 140 of idle trunk circuits provide further assurance that only one trunk will have access to the SZ relay 270 at a time. Busy trunks are disconnected by their SY relays (contacts 284). When the signal received by multifrequency receiver 49 (FIG. 2) is an alarm signal, AM relay 146 supplies a ground to SZ relay 270 in order to provide for the transmission of the reply tone. AM relay 146 is operated by any of those CR relays which respond to alarm signals, shown as CR-A1, CR-A2, CR-A3 . . . in FIG. 19. No further timing is required here, since all CR relays lock to GTD relay 243 (as shown for CR relay 255).

If there is only a single trunk serving the desired destination, of course a much simpler operation is performed when CR relay 255 operates. In such a case, there would be no TSC relay and the SH relay would be operated directly by CR relay 255. The ground from conductor 140 would again be furnished to SZ relay 270 through make contacts of SH relay 256 and break contacts of SY relay 280.

If the trunk circuits at the service center are available to more than one system arranged according to the present invention, the SH relay of an incoming trunk will be operable by the corresponding CR relay of each of these systems and it will be necessary for CR relay 255 also to operate a route (RO) relay corresponding to the particular crossbar switch 45 that is to be brought into play. In fact the RO relay operated is associated with a particular vertical switch, so that it corresponds to the trunk as well as to the route. RO relay 285 serves this purpose. It directs the operating ground connection to the hold magnet 259 of the crossbar switch 45 and likewise the operating ground connection to S relay 173 through contact 278 of crossbar switch 45. It may also, if desired, be used to connect the talking path conductors of the incoming trunk circuit to the crossbar switch 45 with similar RO relays of other systems being available to connect the same trunk circuits to other crossbar switches on calls from other outlying central offices). On the other hand, it may be simpler to let the talking path remain connected to a set of verticals on the crossbar switches of all routes served and relay on the selection chain circuits to protect against double seizure.

Figures 27, 28:
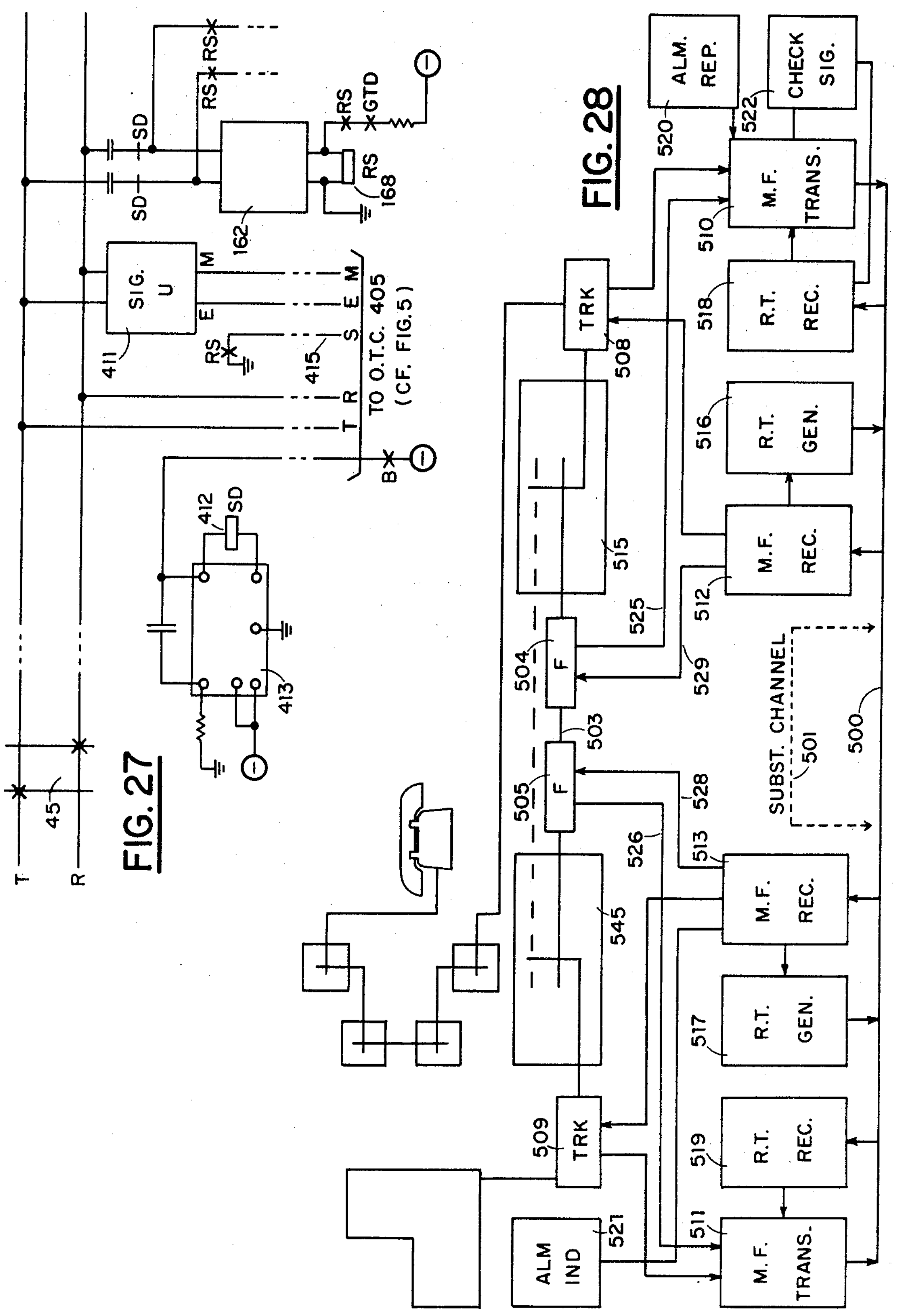
FIG. 27 is a diagram of a facility circuit adapted for use in the system of FIG. 26.
FIG. 28 is a block diagram of a type of system embodying the invention which is an alternative for the system of FIGS. 1 and 2.

FIG. 20 shows an alternative audio detector circuit for use in facility circuits such as those of FIG. 6 and of FIG. 27 respectively for the unit 162 of those figures. Transistor 290 is a peak detector that charges capacitor 291 rapidly when a signal appears at the input 292. When capacitor 291 is charged, RS relay 168 is operated by the chain of emitter followers 292 and 293. Capacitor 291 discharges slowly through the emitter base circuit of transistor 292. Peak detector 290 could be operated directly by the input amplifier comprising the Darlington pair of transistors 294,295. In FIG. 20, however, a Schmitt trigger circuit using transistors 296 and 297 is interposed, which switches from one state to the other when a signal above some very low threshold is present and the peak detector in this particular circuit merely serves to charge capacitor 291 rapidly when the Schmitt trigger circuit switches.

In order to get immediate warning of any important failure in the system even when the system is not busy, it is desirable during all idle periods to generate a signal from time to time and to bring in an alarm if the reply tone is not received in reply. This function is one of the many that can be incorporated in the alarm trunk 77 of FIG. 1. A special destination code is assigned to the check signal. The corresponding CR relay at the receiver, like that for alarm codes, operates AM relay 146 and may also be arranged to operate a counter by which test desk personnel can verify, at least during periods of little or not traffic, that the check circuits of the alarm trunk 77 are functioning.

Figure 21:
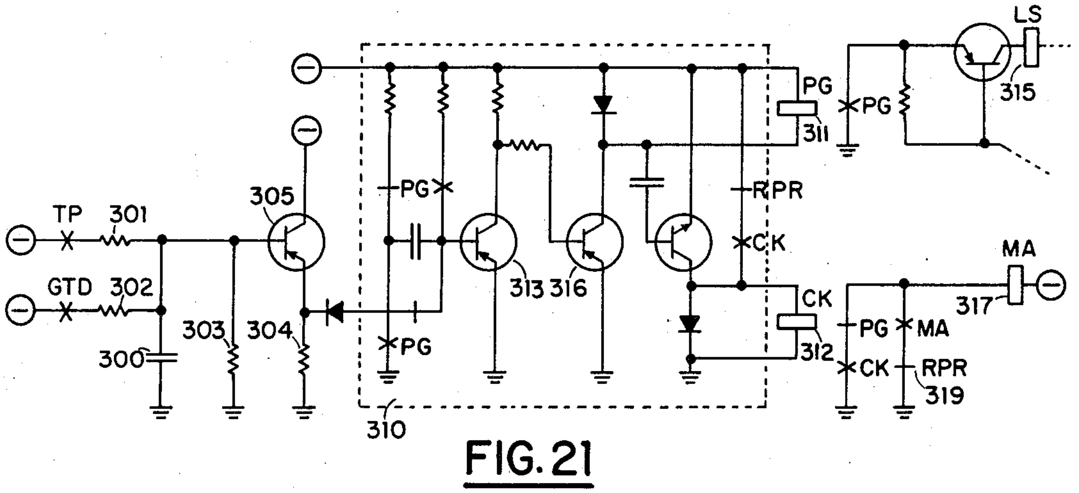
FIG. 21 is a diagram of circuits for a check signal for the system of FIG. 1 and FIG. 2.

There are many ways of providing for the check signal and the verification of the receipt of the reply tone, one of which is illustrated in FIG. 21. In this circuit, capacitor 300 is charged through low resistances 301 and 302 upon operation of the transmitter and the receiver respectively, while discharge of the capacitor 300 takes place gradually through a high resistance 303. The voltage across resistor 303 is made to appear across a lower impedance 304 by the transistor 305 connected as an emitter follower. The supply voltage to transistor 305 may be substantially less than that from which capacitor 300 is charged, because the voltage across resistor 303 is of interest only when capacitor 300 is at or near its discharged state.

Pulse generator 310 is blocked from operating except when capacitor 300 is discharged or nearly discharged. The magnitude of capacitor 300 and resistor 303 are arranged so that the necessary amount of discharge to permit pulse generator 310 to operate does not occur until a period of the order of half a minute to a few minutes has elapsed after the last transmission over the system. Pulse generator 310 is a bistable circuit that operates two output relays 311 and 312 every minute or so while the operation of the pulse generator is not blocked by the voltage across resistor 304 keeping transistor 313 from switching off. PG relay 311 switches timing capacitor 306 to charge through high resistor 307 during the relay's off time and through low resistor 308 during the relay's on time. Capacitor 309 is just big enough to operate CK relay 312 momentarily through transistor 316 when PG relay 311 operates, but CK relay 312 immediately locks over break contacts 318 of RPR relay 126 (or of RPQ relay 229 if preferred). PG relay 311 is operated for a period of about a second, long enough to hold LS relay 315 operated for the period of one transmitter pulse plus the usual time needed to receive a reply tone in response. LS relay 315 is in one of the lockout circuits of the form shown in FIG. 3. Since the pulse generator 310 operates only in idle periods of the system, there will be no delay in operating LS relay 315.

The locking circuit for CK relay 312 is over a break contact of RPR relay 126, so that if the reply tone is received in response to the check signal, CK relay 312 will release before PG relay 313 releases. On the other hand, if the reply tone is not received, maintenance alarm (MA) relay 317 will operate and lock. In due course this alarm as any other alarm connected to the system, will be transmitted by the alarm trunk 77 (FIG. 1) to the alarm indicator panel 78 (FIG. 2). Break contacts 318 and 319 of RPR relay refer to the particular RPR relay which is reached by reply tone receiver 125 over a contact of LS relay 315. If desired, however, contact 319 would be operated by RPQ relay 229, which operates whenever a reply tone is received regardless of which transmitter lockout circuit is connected at the time.

As previously explained, if relatively few destination codes are needed for service calls directed to the service center and if not more than about 30 different kinds of alarms are needed, all the alarm signal pulses generated by alarm trunk 77 (FIG. 1) in response to the alarm detection circuit 75 can be single pulse signals, each kind of alarm having two separate codes, one for alarm on and the other for alarm off, and once an alarm on signal has been sent, the relay requesting the message can be locked over a circuit that will not be released until the corresponding alarm off condition is reported, thereby preventing the sending of a second alarm on signal. It is simple, in a single pulse alarm system, to follow the concepts above described and to associate the necessary lockout circuit for each alarm signal code with a separate alarm trunk circuit having its own appearance on a vertical of the crossbar switch. It is generally inconvenient to utilize so many switch verticals for these short signals (which have to be serially sent anyway since there is only one multifrequency transmitter and one corresponding receiver to handle them). All alarm signals are preferably sent over a single alarm trunk circuit, even though each alarm signal must have its own lockout circuit with its own LS relay. Then, any of the LS relays of the alarm signal lockout will connect the multifrequency transmitter and reply tone receiver to the T and R conductors of the same vertical of the crossbar switch 15 and will operate the corresponding hold magnet through the same Y relay. The check pulse circuit of FIG. 21 likewise could use the same trunk circuit as the alarm signals.

If a variety of alarms are to be reported over the system from several central offices, it becomes necessary to provide arrangements for sending either two pulse alarm signals or three pulse alarm signals. If about half of the destination codes of the system are available for alarm signals, a two pulse system will be satisfactory even for serving many locations, because the destination code sent in the first pulse can be used either to differentiate among the locations of origin of the alarms or to differentiate among the different kinds of alarms, with the second pulse giving the remaining information. For the case in which only three or four destination codes are available for alarms and for check signals, it is necessary to go to a three pulse alarm system if there are many kinds of alarms and many reporting locations. A three pulse alarm signal for use in the service center system of this invention is illustrated in FIGS. 22–25 inclusive. From this illustration it will be readily understood how the simpler one and two pulse systems could be provided in appropriate situations.

Figure 22:
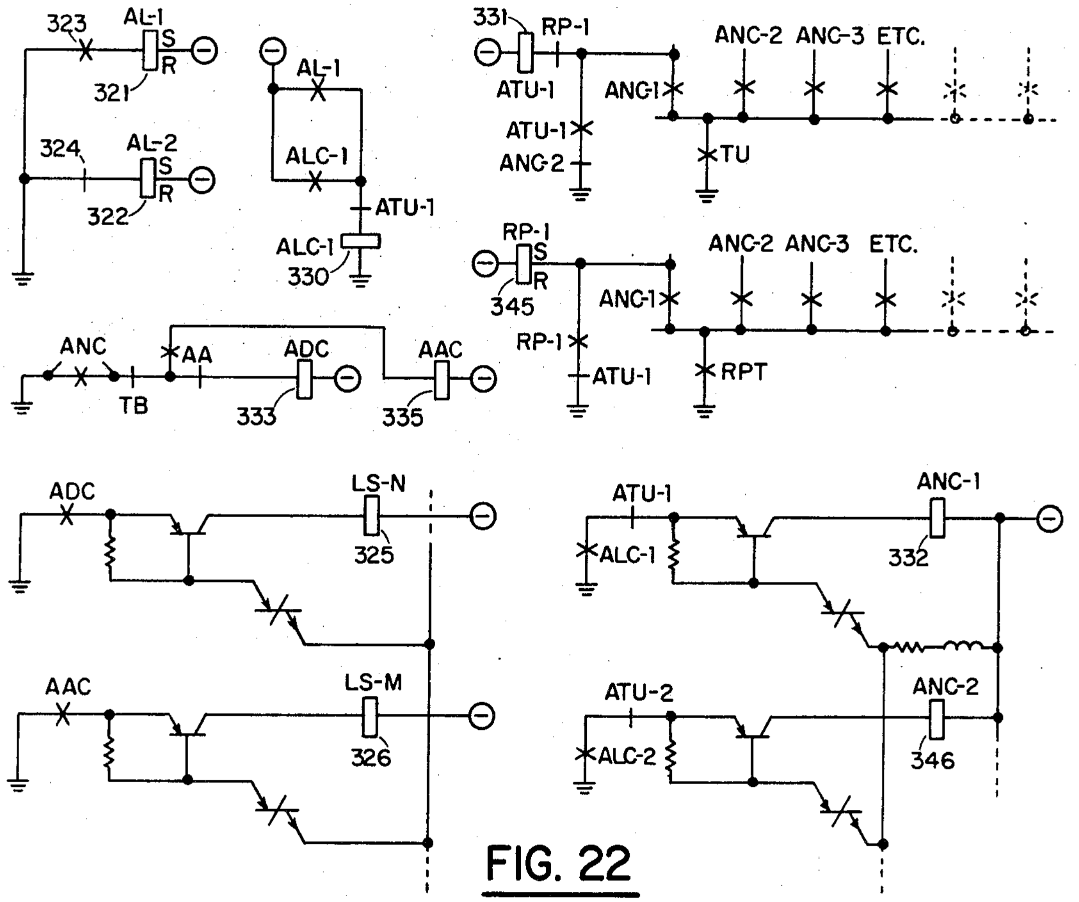
FIG. 22 is a diagram of alarm generation and transmitter lockout circuits for activating the transmission of a 3-pulse alarm signal in a system embodying the invention.

FIG. 22 shows the alarm generation and lockout circuits. In the case of a typical alarm, the alarm detection arrangement (not shown) operates AL relay 321 when the alarm is on and AL relay 322 when the alarm is off, by means of contacts 323 and 324. These relays should be slow release types if the alarm detector is the kind that doesn't stay on steadily once the alarm condition is present. As mentioned previously, alarm on signals and alarm off signals are treated as separate and equally important signals. It is hence convenient to designate the various circuits by pairs of numbers, with the odd numbers, for example, representing alarm on conditions and the next even higher number representing the corresponding alarm off condition. Thus relay 321 could be designated AL-1 and relay 322, AL-2 and so on. In FIG. 22 the relays with letter designations followed by a dash and a numeral are relays of a particular alarm circuit whereas those without the following numeral are relays of the alarm trunk circuit 77 that are not duplicated for each separate alarm circuit. Although in a three pulse system all the alarms could be directed to a single destination code, for reasons of reliability two destination codes are preferably used, which means that there are two LS relays, LS-N relay 325 for the normal alarm destination code and LS-M relay 326 for the alternate alarm code. Both of these are distinct from the lockout circuit of the check signal generator shown in FIG. 21 which uses still another destination code, but as mentioned before all three use the same vertical on the crossbar switch 15 and the same Y relay.

AL-2 relay 321 in operating, operates ALC-1 relay 330, which locks itself over break contacts of ATU-1 relay 331 (these contacts are also in the operating path). Another tier of alarm lockout circuits, ahead of the transmitter lockout circuits, is needed for the various alarm signals to avoid mutual interference of these signals in the event that two or more alarms should be registered simultaneously. Since the three pulse system to be described is intended to handle alarms of many different kinds from many different locations, the problem of simultaneous alarms must be faced, but since long busy periods for these signals are not to be anticipated, the function of TB relay 105 of FIG. 3 is not needed and the lockout circuits to queue the alarm signals can be simplified to that extent, as illustrated in FIG. 22 in the operating paths of ANC-1 relay 332 and of ANC-2 relay 346.

ALC-1 relay 330 activates its corresponding lockout circuit and causes the operation of ANC-1 relay 332 either immediately or after the lockout circuit of some other alarm signal has been cleared. The operation of ANC-1 relay 332 represents a request for transmission and causes the operation of ADC relay 333 either immediately or, as pointed out in FIG. 3, as soon as TB relay 105 releases. The foregoing assumes that AA relay 334 has not been operated by the circuit shown in FIG. 24, described below, for in that case the operation ANC-1 relay 332 would cause the operation of AAC relay 335 instead of ADC relay 333. As mentioned before, the operation of ADC relay 333 operates the lockout circuit which will bring in LS-N relay 325 corresponding to the usual alarm destination code, whereas, the operation of an AAC relay 335 activates the lockout circuit which brings in LS-M relay 326 for transmitting the alternate alarm code. At the receiver (FIG. 25) the response is the same regardless of which of these designation codes is used.

The lockout circuit containing LS-N relay 325 is designed to remain operated until released either in consequence of the operation of TU relay 340 or RPT relay 341 (FIG. 24), but since it is necessary in the former case to prevent repeated requests for transmission of the same alarm signal, the effects of these last mentioned relays are brought to bear upon ALC-1 relay 330 rather than merely to the transmitter lockout circuit. This requires a circuit to be branched to all the ANC relays, so that the ground in question can be furnished to the particular ATU relay which corresponds to the ANC relay which is operated by the alarm lockout circuits. Thus, ATU-1 relay 331 is operated when TU relay 340 operates during the time ANC-1 relay 332 is held operated in the alarm lockout circuits. ATU-1 relay 331 then locks itself over break contacts of RP-1 relay 345 and ANC-2 relay 346. Operation of ATU-1 relay 331 releases ALC-1 relay 330 and prevents its operation, provided RP-1 relay has not operated or does not operate, until after the corresponding alarm off condition shall have been registered. RP-1 relay 345 is similarly arranged to be operated by RPT relay 341 only while ANC-1 relay 332 is held operated in its alarm lockout circuit. RP-1 relay 345 locks itself over break contacts of ATU-1 relay 331, but is made slow releasing so that it will be sure to remain operated long enough to release ATU-1 relay 331, which will then break its own locking path.

Figure 23:
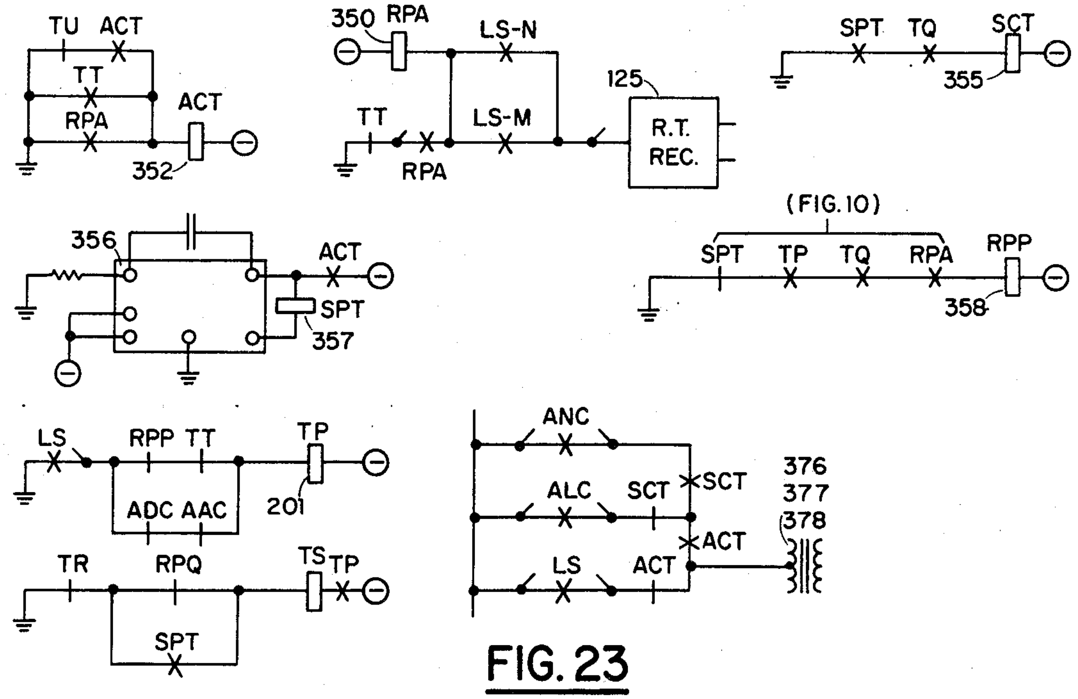
FIG. 23 is a diagram of a modification of the transmitter timing and coding circuits of FIGS. 9-12, inclusive, for the purpose of transmitting 3-pulse alarm signals.

FIG. 23 shows the modifications of the transmitter pulsing and coding circuits necessary for the three-pulse alarm system. The first portion of the alarm signal transmission is just as described in connection with FIG. 3, that is, a pulse giving the appropriate destination code is transmitted and if an immediate reply tone is not received, the pulse is repeated. After these operations, however, the modifications of the circuits of FIG. 9 and FIG. 10 which are shown in FIG. 23 come into play. As shown in FIG. 3 the reply tone receiver 125 is connected to relays in the various trunk circuits respectively over contact of the various lockout selector (LS) relays of each trunk circuit. FIG. 23 shows that when LS-N relay 325 or LS-M relay 326 is operated, the reply tone receiver 125 is arranged to operate RPA relay 350, which locks until released by TT relay 215.

Either the operation of RPA relay 350 or that of TT relay 215 (FIG. 10) initiates the sequence of events involved in sending the second and third pulse by operating the alarm code transfer (ACT) relay 352 (FIG. 23), which locks itself to the TU relay 340. As shown in the lower right-hand portion of FIG. 23, ACT relay 352 transfers each code contact lead of the tuned transformers 376, 377 and 378 of the multifrequency generator of FIG. 12 to the contacts of the alarm location code (ALC-1) relay 330, which is the same relay (FIG. 22) that originally registered the demand for an alarm signal. The transfer of the connection of the code contact leads is in this case done over break contacts of the second code transfer (SCT) relay 355, the function of which is further described below, The operation of ACT relay 352 activates the second pulse timer circuit 356 which operates SPT relay 357 after an interval allowing for the release of TP relay 201, TQ relay 205, TS relay 212 and TT relay 215.

As shown in FIG. 23, the operating path of TP relay 201 is modified for the purpose of the 3 pulse alarm system, so that this relay will be released either by operation of RPP relay 358 of FIG. 21 or by the operation of TT relay 215 of FIG. 10, but this modification is made ineffective except for the case of alarm signals by a bypass over break contacts of ADC relay 333 and AAC relay 335. RPA relay 350 acts on TP relay 201 only through RPP relay 358 which cannot be operated after timer 356 has caused SPT relay 357 to operate, so that it cannot reset the pulse circuit after the second pulse as it can after the first.

At the end of the second pulse, (not counting a repeated first pulse), the second code transfer (SCT) relay 355 is operated to transfer the code contact leads of the multifrequency generator to the alarm nature code (ANC) relay 332 which, like the LS relay that determines the destination code, is also involved in a lockout circuit, in this case the alarm lockout circuit (FIG. 22). The circuit of TS relay 212 (FIG. 10) may be modified, as a precaution against an unlikely premature reply tone, in the manner shown at the lower left of FIG. 23, for the purposes of the third pulse.

Figure 24:
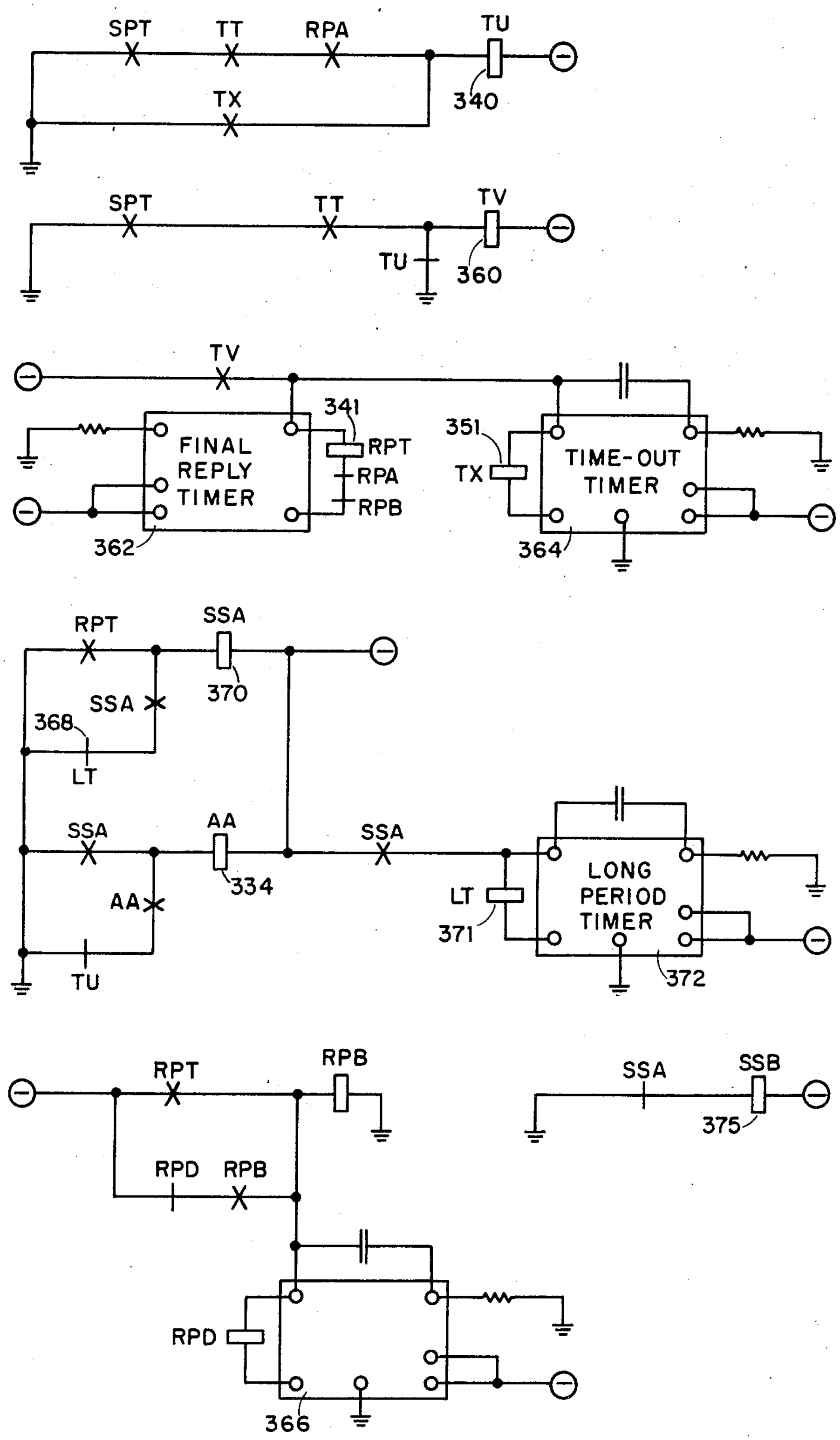
FIG. 24 is a diagram of a modification of the circuit of FIG. 11 to enable the circuit to handle 3-pulse alarm signals.

FIG. 24 shows the relay sequence that operates at and immediately after the end of a third pulse. The third pulse of the transmitter ends with the operation of TT relay 215 (FIG. 10) wit h SPT relay 357 operated. The receipt of a reply tone thereafter operates RPA relay 350 which completes the operating path for TU relay 430, the operation of which, as previously mentioned, operates ATU-1 relay 331 (FIG. 22) and releases ACT relay 352 (FIG. 23). In the meanwhile the operation of TT relay 215 has released TP relay 201 and the others of the transmitter timing circuit held by the latter. The operation of TT relay 215 with SPT relay 357 operated, also operated TV relay 360, which activates the final reply timer 362 and time-out timer 364. Timer 362, after an interval, causes repeat (RPT) relay 341 to operate if at that time RPA relay 350 has not operated in response to a reply tone pulse. The operation of RPT relay 341 operates RP-1 relay 345, (FIG. 22) as previously mentioned, releases or prevents operation of ATU-1 relay 331 and thus allows ALC-1 relay 330 to reinitiate the alarm signal. To prevent excessive repetition of attempts to send an alarm signal, either RP-1 relay 345 or else RPT relay 341 should be prevented from operating more often than once in several minutes by the circuit associated with timer 366. It is more economical to apply this circuit to RPT relay 341, as shown in FIG. 24, than to provide one such circuit to each alarm signal circuit. The chances are that if more than one alarm signal has trouble getting acknowledged, the trouble will affect all of them, so that it will do just as well to restrict the operation of RPT relay 341 as to restrict that of the RP relays.

Timer 364 has a slightly longer period than timer 362. At the end of this slightly longer period TX relay 351 operates and operates TU relay 340 in case it had not yet been caused to operate. The operation of ATU-1 relay 331 caused by the operation of TU relay 340 releases ALC-1 relay 330 and ANC-1 relay 302, followed by release of ADC relay 333 or AAC relay 335, as the case may be, and likewise LS-N relay 325 or LS-M relay 326. In consequence, TP relay 201 releases, releasing TQ relay 205, TR relay 211 and TS relay 212, the latter of which releases TT relay 215, which in turn releases RPA relay 350. The alarm lockout circuit, transmitter lockout circuit and transmitter timing circuits are now all reset.

The conditions requiring RPT relay 341 to operate represent a malfunction of the system. Accordingly operation of RPT relay 341 operates service system alarm (SSA) relay 370 which locks to break contacts 368 of LT relay 371, which is adapted to be operated a considerable period later, say one hour, determined by long period timer 372. Although the latter is shown in the same way as other semiconductor timers, it is to be understood that it is more practical to use a resettable clock motor for timing such long periods rather than semiconductor circuits with large capacitances and high resistance.

SSA relay 370 operates AA relay 344 which changes over the alarm trunk from one destination code to another as previously described. A holding circuit is provided for AA relay 334 over break contacts of TU relay 340 in order that AA relay 334 will not release at the exact moment that SSA relay is caused to release by operation of LT relay 371 but only after the next operation of TU relay 340, thus preventing the release of AA relay 344 from mutilating an alarm signal. SSA relay 370 by means not shown registers an alarm sent as any alarm signal to the service center and in order to have a corresponding negative of this alarm condition in order to generate alarm off signals, the inverse of the condition is registered by SSB relay 375.

Figure 25:
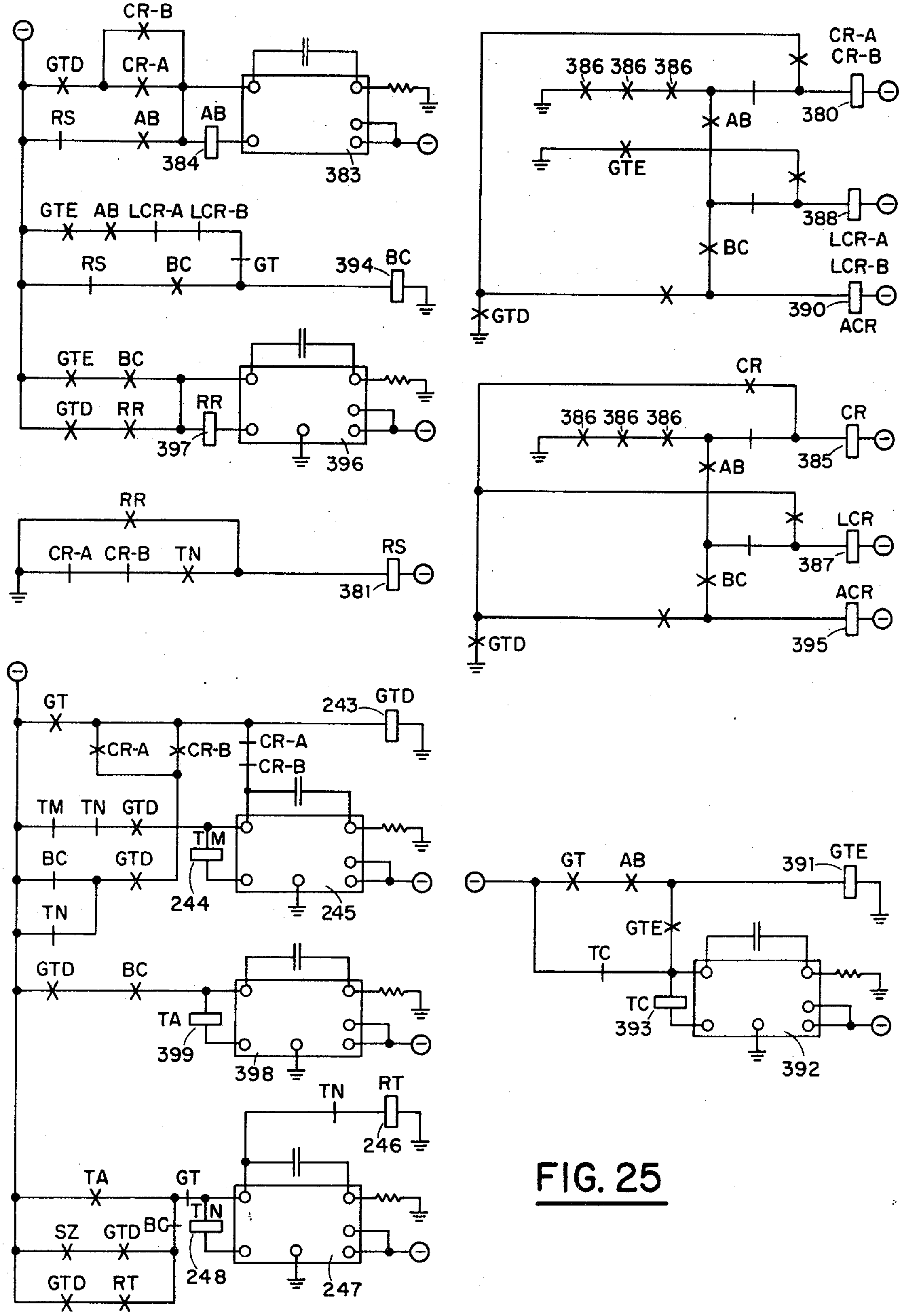

FIG. 25 shows receiver circuits and circuit modifications (of FIGS. 14 and 16) for use at the service center when the three-pulse alarm system above-described is used in the system of FIGS. 1 and 2. Code recognition relays CR-A and CR-B (represented by relay 380) are those of the CR group which respond respectively to the alarm destination code and the alternate alarm code abovementioned. On operating, either of these relays locks itself to GTD relay 243. The functions of AM relay 146 of FIG. 19 are provided in this case by the CR-A and CR-B relays.

On the first pulse of an alarm signal, over contacts of GTD relay 243 and of relay 380 (either CR-A or CR-B), timer 383 is activated, which is designed to operate AB relay 384 in the interval between the first and second pulses of the signal. AB relay 384 transfers the circuits of code element contacts 386 from the code recognition (CR) relays to the location code recognition (LCR) relays, so that on the next pulse, instead of CR relay 385, LCR relay 387 will operate. It is necessary to take account, however, of the possibility that the reply tone was not received at the outlying central office after the first pulse and that the second pulse therefore repeats the first one. In this case, either LCR-A relay or LCR-B relay (represented by relay 388) will be operated. This relay locks to GTE relay 391 (whereas other code recognition relays lock to GTD relay 243), and blocks the operation of BC relay 394 by GTE relay 391 until the next pulse. This problem of course does not apply to the third pulse and there is no comparable restriction on the use of ACR relay 390. Contacts 386 of FIG. 25 are contacts of various code element relays (FIGS. 13 and 16).

At the end of the true second pulse, BC relay 394 is activated. GT relay 240 operates GTE relay 391 on both the second and third pulses. The latter releases shortly after GT relay 240 releases but before the latter operates again. GTE relay 392 could be a slow release relay operated by GT relay 240, but it is preferably timed by timer 392 and TC relay 393. BC relay 394 is operated during the interval between the second and third pulses and locks itself to RS relay 381. BC relay 394 transfers the code element circuits so that the next pulse will operate alarm code recognition (ACR) relay 395. LCR relay 387 and ACR relay 395 provide the necessary operations (by means not shown) on alarm indicator panel 78 (FIG. 2).

The arrival of the third pulse activates timer 396 which operates RR relay 397 after the end of the third pulse. The latter operates reset (RS) relay 381, which is also operated at the end of every ordinary reply tone transmission by TN relay 248 to assure that the circuits of FIG. 25 are normally in reset condition. This last precaution is not strictly necessary and RR relay 397 could, at the saving of one relay, directly reset the circuits after the third pulse of an alarm signal.

Operation of relay 380 (either CR-A or CR-B) transfers the timing of GTD relay 243 from timers 245 and 247 to timers 398 and 247. After BC relay 394 operates the normal path for activation of TN relay 248 and RT relay 246 is blocked, as appears in the modified circuit for these relays shown in FIG. 25. TA relay 399 is operated just before the end of the third pulse by timer 398 and remains operated until GTD relay 243 releases. The operation of TA relay 399 prepares a path for operation of RT relay 246 and activation of timer 247 as soon as GT relay 240 releases at the end of the third pulse. TN relay 248, at the end of the reply tone transmission, releases GTD relay 243. The operating paths of GTD relay 243, RT relay 246 and timers 245 and 247 shown in FIG. 14 are preserved in the modifications shown in FIG. 25 so that they will be available on nonalarm signals.

When a multipulse alarm system is used at the same time as a call connecting system using fewer pulses, typically a single pulse, there is a possibility that the first pulse of an alarm signal, and its repetition also, might get suppressed by some transmission difficulty and that the remaining pulse or pulses might appear to the receiver as a proper connection code. In this case a false connection could be made and the reply tone sent. The false connection would be only a momentary disturbance, since at the end of the alarm signal the facility circuits and the connection would be released. The more serious contingency is the false acknowledgement of the alarm signal without the desired effect of the alarm signal having been registered at the alarm indication panel 78. To guard against this contingency, a distinctive reply tone could advantageously be used for alarm signals - either a tone of a different frequency or a combination of the usual reply tone with an additional different tone. The use of a reply tone of a different frequency for acknowledging alarm signals is feasible because the service center needs relatively few destination codes for its outgoing calls (as it will typically use tie trunk circuits equipped for further dialing when the outlying central office is reached) and a second frequency can be withdrawn from the multifrequency coding group and used instead for reply tone coding. The outgoing alarm reporting trunk circuit can be caused to switch the reception frequency of the reply tone receiver 39 while its transmitting lockout circuit is active (by means of contacts (not shown) of the LSN relay 325, for example). At the receiver CR relay 380 can likewise (by means of contacts not shown) put the reply tone generator 65 on to a different operating frequency.

On routes where the service traffic is rather light a more economical system according to the invention may be provided in which the voice frequency signaling equipment sets up connections only in one direction, while traffic in the other direction is handled by having an idle facility circuit selected manually, which is feasible at telephone company operator and test positions. The idle facilities can be indicated by a switchboard lamp lighted by an associated outgoing trunk circuit when the facility is idle. Alternatively, the associated trunk circuit can mark the jack so that the operator can determine whether it is busy by touching it with the plug of the operator's cord before engaging the talking circuit. At the outlying central office the facility circuits can be equipped with supervisory relays so that when they are seized by incoming calls, as distinguished from outgoing calls, they will connect with an incoming trunk circuit of the class known as "toll switching," thus bypassing the crossbar switch 15 and allowing the calling party access to the central office switching equipment into which he can dial a desired connection.

Figure 26:
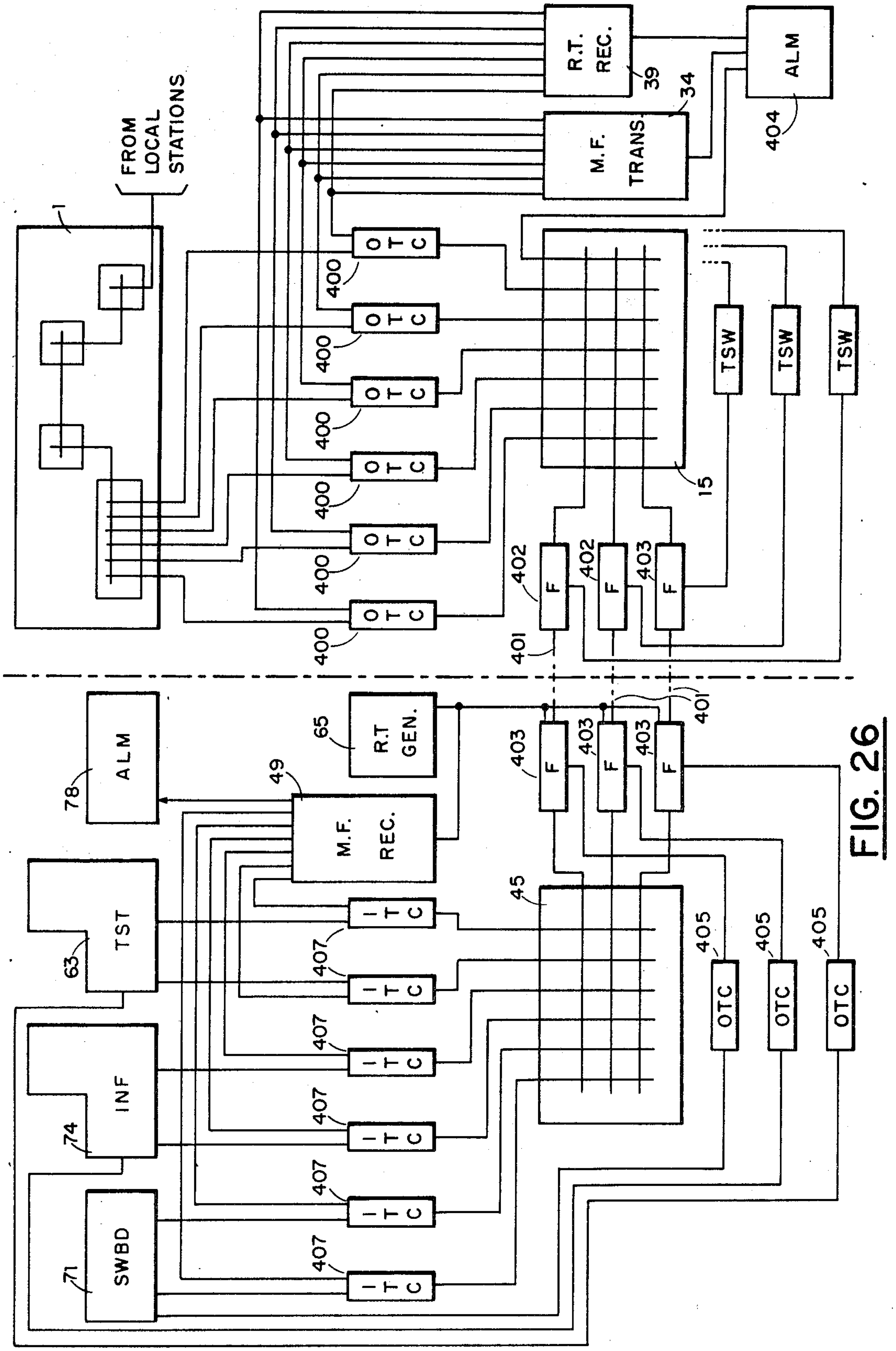
FIG. 26 is a block diagram of a one-way service call system for low traffic routes.

Such a system is shown in block diagram in FIG. 26. The outgoing trunk circuits 400 represent a much greater quantity than the six shown, since many would normally be used for all the various services involved even where, relatively speaking, the traffic is light. Likewise, the channels 401 and the facility circuits 402 and 403, respectively at the outlying central office and at the service center, represent considerably more than the three of each shown in FIG. 26. Alarm unit 404 is a simplified indication of an alarm trunk circuit and alarm detector circuits such as are shown at 76 and 77 respectively in FIG. 1. The multifrequency transmitter 34, the reply tone receiver 39, the multifrequency receiver 49 and the reply tone generator 65 have the same function as the correspondingly numbered units of FIGS. 1 and 2. They may be simplified in some small details because of the fact that they serve to connect calls or alarms in only one direction, so that there is no problem of interference from similar transmissions operating in the other direction.

The incoming trunk circuits 407 represent the many more than the 6 shown in FIG. 26 that would be provided at the service center in the system described. The selection chain circuits are not shown by specific blocks in FIG. 26, as was done in FIG. 2, but for FIG. 26 it can be understood that they are part of the multifrequency receiver 49. Of course, if the incoming trunk circuits 407 are to be connected with systems serving several different routes to various outlying central offices, the selection chain circuits would have to be accessible to the various multifrequency receivers just as the incoming trunk circuit 407 would have to be accessible from the various crossbar switches.

There is a possibility of a simultaneous seizure of one of the facilities 403 through one of the outgoing trunk circuits 405 just when the former ceased being idle. The best precaution to take in this case is to delay briefly the disconnection of the detector unit 162 from the talking circuit, so that the receiver 49 has a chance to operate the GTD relay 243, if a multifrequency code was transmitted before the facility at the other end could be seized by the call from the service center. There must be no corresponding delay of the operation of any signaling unit involved for operating supervisory relays, but if an incoming call is detected it must be given priority and the calling party at the service center must be warned that the facility is not available to him. A facility circuit for dealing with this problem at the service center is shown in FIG. 27. The signaling unit 411 connects to the E and M leads of the outgoing trunk circuit 405, which in this case is of the type shown in FIG. 5.

Where the channels associated with the facilities circuit provide the possibility of direct current supervision arrangements, it is relatively easy to catch an incoming multifrequency signal that was sent just before the facility could be seized at the other end by the supervisory relay. If as shown in FIG. 27 the facilities circuits are connected with signaling units for supervisory purposes, however, there is a possibility that the alternating current applied to the talking circuit by a signaling unit might operate RS relay 168. Of course, the GT relay 240 of the receiver will not respond so the only problem is that RS relay 168 cannot be relied on to determine whether a multifrequency pulse arrived just as the facility is seized by an outgoing trunk circuit 405.

In the facility circuit of FIG. 27, since the crossbar switch 45 operates only on incoming calls, there are no arrangements for seizing the facility through that crossbar switch. All that RS relay 168 has to do, in order to mark the facility busy, is to provide ground to the S lead 415 of any outgoing trunk circuit that might seek to use the facility. When the outgoing trunk circuit 405 seizes the facility, detector circuit 162 is not immediately cut off but is cut off a fraction of a second later by SD relay 412 operated by timer 413 or any equivalent arrangement, so that the receiver has a chance to recognize a multifrequency pulse in the event that one came from a simultaneous seizure at the other end. If so, then GTD relay 243 of the receiver operates and in this case it must be arranged to signal the caller over make contacts of RS relay 168 in some way (not shown) to warn him that the channel is busy. It could apply busy tone to the trunk circuit on the calling side of contacts 194 and 195 (FIG. 5) and perhaps also block the operation of 0A relay 197, but preferably it prevents operation of a "ready to dial lamp" (not shown) on the switchboard normally operated by the trunk circuit in a known manner.

It is important of course, to so arrange signaling transmission frequencies that the output of unit 411 serving the supervision circuits does not interfere with the operation of the multifrequency receiver or the reply tone receiver. This consideration applies also to when trunk circuits of the type of FIG. 5 and FIG. 18 are used in the system of FIGS. 1 and 2.

The outlying central offices may have various kinds of switching systems connecting the numbers used at its location for service center calls with the lines of various customers telephones. These various systems, as used in any one telephone system, are designed to be compatible with each other so that an office with one kind of equipment can work into a central office with one of the other kinds of equipment. Consequently, they are all generally susceptible of working into a system of the type of FIG. 1. In a system of the general type shown in FIG. 26, designed for central offices having relatively little traffic, there is a particular interest in accomplishing the objectives of the present invention with a minimum modification of trunk circuits and the like, in order that the additional equipment required for obtaining the benefits of the invention should not be too great in comparison with the expected annual savings. In such cases, the application of the invention to particular switching systems, particularly to the less flexible step-by-step type of equipment, may naturally involve a number of expedients related to the particular type of trunk circuits used with this type of central office.

It is common in the smaller offices of this class to direct all service calls to the toll switchboard operator. A one way system according to the invention, using a crossbar switch at each end of the route as in FIG. 26, can be adapted to this arrangement to relieve the toll switchboard operator of the task of handling repair and information calls and the like, by interposing a crossbar switch between the final selectors involved at the outlying central office and the operator office trunk circuits into which they normally work, this, however, requiring a kind of trunk circuit between each of these selectors and the crossbar switch to perform some of the functions of the operator office trunk circuit during the period between final selector operation and operation of the crossbar switch. The operator office trunk circuit then becomes a facility circuit. At the service center end, a crossbar switch is interposed ahead of the operator office trunk at the toll switchboard and of course each incoming channel must then have some kind of a facility circuit ahead of the crossbar switch through which the multifrequency receiver can pick up a multifrequency signal. Such a system, accordingly, conforms to the block diagram of FIG. 26 and the handling of the various types of connections both into the service center and out of it is still basically the same as described in connection with FIG. 26.

FIG. 28 shows another way of organizing the voice frequency signaling equipment for setting up the connections in a service center system in accordance with the present invention. In this case, the voice frequency signaling equipment is connected to a signaling channel 500 which is used only for signaling and is not available as a talking circuit for calls to and from the service center. Since the operation of the entire system in this case depends upon the setting up of connections by the voice frequency signaling equipment, there must be provision, which can be accomplished in various known ways, for providing a substitute channel 501 (perhaps exchanging connections with one of the channels between the crossbar switches 515 and 545) quickly upon the detection of any failure in the channel 500.

The great advantage of the arrangement of FIGS. 1 and 2, as compared with that of FIG. 28, is that the setting up of a call makes a test of the channel between the two crossbar switches which the call will use once it is set up. Furthermore in FIGS. 1 and 2 the check signal verifies on a random basis during idle periods the operability of the channel facilities as well as of the signaling equipment. These safeguards for detecting a malfunction before it produces an extensive tieup are sacrificed and relegated to other maintenance procedures in the arrangement of FIG. 28. On the other hand, the arrangement of FIG. 28 eliminates the need of voice frequency detectors and connections to the multifrequency signal receiver on all of the facilities circuits at each end of the route. It furthermore makes possible the arrangement of the signaling circuit so that during busy periods mutual interference by concurrent requests for service from both ends of the route can be somewhat more surely prevented. Finally, in the arrangement of FIG. 28, there is no possibility of an alarm signal being delayed by an all facilities busy condition.

In FIG. 28, the crossbar switch 515 is located at the outlying central office and the crossbar s witch 545 at the service center. The channel 503 and its terminal facilities 504 and 505 are representative of the multiple channels and facilities available. The trunk circuit 508, although the only one shown at the outlying central office in FIG. 28, is likewise representative of a multiplicity of available trunk circuits. The same holds for the trunk circuit 506 which is representative of the many trunk circuits to or from which calls may be placed at the service center. Multifrequency transmitters 510 and 511, multifrequency receivers 512 and 513, reply tone generators 516, and 517, reply tone receivers 518, and 519, alarm reporting circuit 520 and alarm indicator 521 have basically the same function as the corresponding units shown in FIGS. 1 and 2. The check signal circuit 522, similarly, operates in the same fashion as that described in connection with FIG. 21, but in this case checks only the signaling circuits and signaling channel.

In the system of FIG. 28, each signal from the multifrequency transmitter at one end of the route to the multifrequency receiver at the other end must be composed of two pulses, the first to designate the facility and channel that has been seized by the trunk 505, the information being provided from the facility 504 or 505 to the multifrequency transmitter over the path 525 or 526 respectively, followed by a second pulse designating the trunk or the trunk group which it is desired to reach at the other end of the route. The receiver uses the first pulse to make the corresponding facility busy at its end and to operate the corresponding select magnet of the crossbar switch over the path 528 or 529, as the case may be, and uses the second pulse to cause the desired connection to be set up in the manner previously described.

In this type of a system, alarm signals consisting of two pulses can be provided with a minimum of arrangements peculiar to alarm signals, and of course three pulse alarm signals can be provided instead if desired. In this system as, in the system of FIG. 1, the modification of the reply tone to indicate that the receiver has found an all trunks busy condition may be provided in the same way as was described in connection with the system of FIG. 1.

Since the multifrequency and reply tone transmitters and receivers are continuously connected to the same signaling channel in the system of FIG. 28, it is possible to set up an effective system for preventing the multifrequency transmitters from interfering with each other during busy periods. This is done by arranging the transmitters and receivers so that the reply tone answering a received transmission is withheld when there is a transmission waiting to to the other way until that transmission has been sent. The transmitter lockout circuits, of course, do not switch to the next waiting request until the reply tone comes, so that the transmitter does not send its next signal until the other end has had a chance to put in a signal if it has one to send. If it has none to send, it sends the reply tone immediately, so that no time is lost by the arrangements giving the other end an opportunity to come in, even when a long sequence of calls is being placed. Giving each end an equal opportunity to set up connections is appropriate even though the traffic towards the service center will normally be heavier. The priority available to operator assistance traffic when a major proportion of the facilities are busy also denies facilities to traffic outward from the service center. At any rate, telephone systems and employees would be the persons making calls from the outward service center and should be relied upon to avoid making unimportant outward calls during periods of heavy inward traffic.

When the channel 500 is idle, of course, there is a possibility of both ends starting transmission at the same time in spite of the obvious precaution of blocking the beginning of a transmitter pulse when the audio gate circuit of the receiver is responding to a received pulse. In this case of simultaneous transmission, both receivers will be blocked by the nearby transmitters. The signal from the outlying office will be repeated after a slight delay without releasing the lockout circuit, so that a second failure can register a trouble alarm. The service center transmitter will release the lockout circuit on a time-out. Since this "collision" situation can, in the system of FIG. 28, occur only after the channel 500 has been idle, very little traffic is affected by any such instance of false starts by the signaling system.

Figure 29:
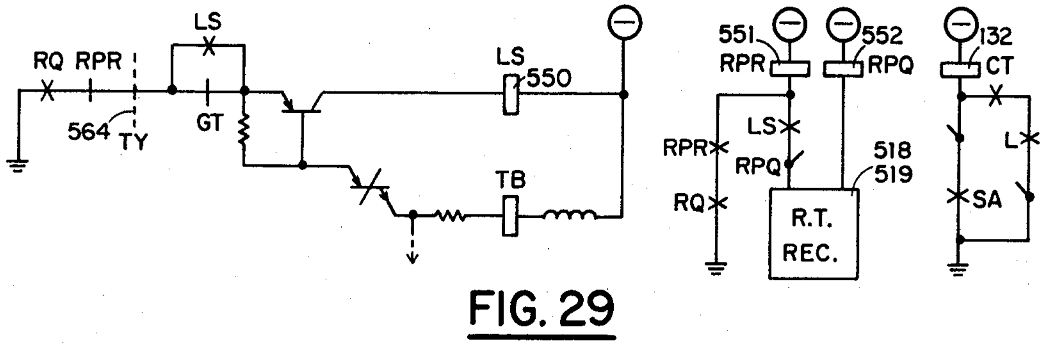
FIG. 29 is a diagram of modifications of the circuits of FIG. 3 for use in the system of FIG. 28.

FIG. 29 shows modifications of FIG. 3 for use in the corresponding portion of the system of FIG. 28. The release of LS relay 550 in this case is again by operation of RPR relay 551. Reply tone receivers 518 and 519 each operate an RPQ relay 552, which does not lock and which affects the transmitter timing circuits (FIGS. 31 and 32) and also a relay corresponding to RPR relay 551 associated with whatever trunk circuit is being served (hence reached over contacts of the corresponding LS relay).

Figure 30:
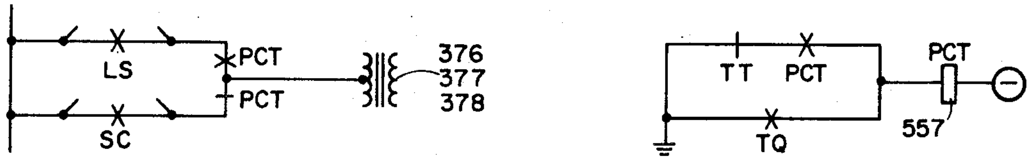
FIG. 30 is a diagram of modifications of the circuits of FIG. 12 for use in the system of FIG. 28.

The multifrequency transmitters 510 and 511 must of course be arranged to send two differently coded pulses. As shown in FIG. 30 the code contacts associated with the tuned transformers 376, 377 and 378 of the multifrequency generator of FIG. 12 are arranged to be switched by the pulse code transfer (PCT) relay 557 when the first pulse ends with the operation of TQ relay 205 (FIG. 9). PCT relay 557 then locks itself until released by operation of TT relay 215 at the end of the second pulse. During the first pulse the multifrequency code is determined by SC relay 177 (FIG. 6), thus identifying the facility which has been seized at the calling end. During the second pulse, with the transfer contacts of PCT relay 557 operated, the code sent is the destination code determined by LS relay 550.

Figure 31:
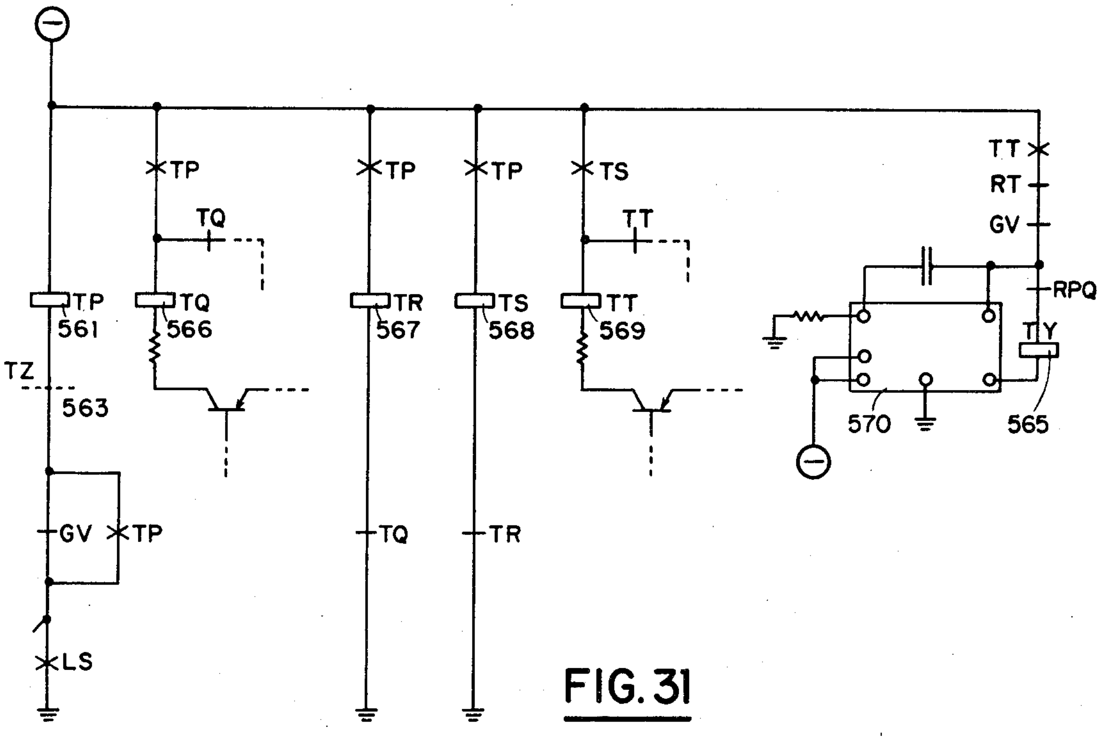
FIG. 31 is a diagram of modifications of the circuits of FIGS. 9 and 10 for use in the system of FIG. 28.
Figure 32:
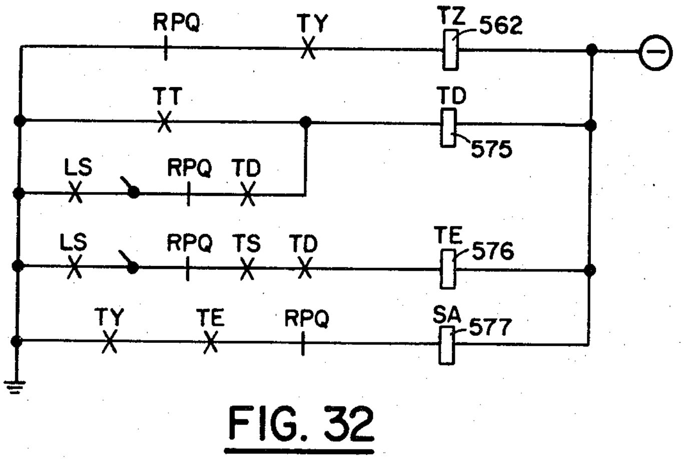
FIG. 32 is a diagram of circuits supplementary to the circuits of FIGS. 9 and 10 for the timing out function for the system of FIG. 28.

The timing circuits of FIGS. 9, 10 and 11 must also be modified, as shown in FIG. 31, in the multifrequency transmitters 510 and 511. If TP relay has not already operated when LS relay 550 operates and at that time GT relay 240 (FIG. 13) is operated because the receiver is receiving a multifrequency signal from the other end of the route, the operating path of TP relay 561 is interrupted until GV relay 597 (FIG. 33) releases. At the outlying central office, in transmitter 510, but not in transmitter 511 at the service center, the operating path of TP relay 561 is also adapted to be interrupted by operation of TZ relay 562 of FIG. 32, as shown by the dashed line contact 563 in FIG. 31, to cause repetition of the two pulse message if no reply tone is received. In transmitter 511 at the service center the corresponding function is the interruption of the operating path of LS relay 550 by the dashed line contact 564 (FIG. 29) of TY relay 565 (FIG. 31) and the application of busy tone to the calling station (not shown).

The operation of TQ relay 566, TR relay 567, TS relay 568 and TT relay 569 follows in the same way as the corresponding sequence described in connection with FIGS. 9 and 10, except that there is no provision for blocking the second pulse by the arrival of reply tone and accordingly TS relay 568 need not be so slow in releasing, since the release time needs only to allow sufficient time for the operation of PCT relay 557 in the interval between the two pulses.

The operation of TT relay 569 at the end of the second transmitter pulse activates timer 570 which operates TY relay 565 at the end of the timed period, but only if RPQ relay 552 has not operated in the meanwhile as the result of reply tone being received. The period of timer 570 allows only for a reply tone sent when the other end has no traffic waiting, but if there is traffic waiting and a multifrequency pulse comes first, GV relay 597 (FIG. 33) will recycle timer 570. Likewise if the other end is waiting for a reply tone, that must be sent immediately after the m.f. transmitter pulses, in which case RT relay 572 (FIG. 33) recycles timer 570.

Operation of TY relay 565 in the transmitter 511 at the service center releases LS relay 550 if the latter has not already been released as the result of reply tone received during the operating period of timer 570. Release of LS relay 550 releases TP relay 561 which directly or indirectly restores to starting position all the relays shown in FIG. 31. Release of LS relay 550 upon reception of reply tone operates in the same way in transmitter 510 at the outlying central office, but if reply tone is not received, TY relay 565 is arranged in this case (transmitter 510) to initiate a repetition of the transmission and to register an alarm if the second attempt fails to raise a tone reply, by means of the circuits of FIG. 32.

In this case TY relay 565 causes TZ relay 562 to operate, which by contacts 563 releases the operated relays of FIG. 31, including TY relay 565. At this time PCT relay 557 of FIG. 30 is released because TT relay 569 releases. However, LS relay 550 being still operated, when the release of TY relay 565 in turn releases TZ relay 562, TP relay 561 is reoperated and the transmitter pulse sequence is repeated. This time, however, TD relay 575 being operated, having locked to LS relay 550 when TT relay 569 operated at the end of the first attempt of the transmitter to send its message, ID relay 575 prepares a path for operation of TE relay 576 when TS relay 568 operates a second time. TE relay 576 prepares a path for operation of relay SA relay 577 when TY relay 565 operates a second time, which happens only if no reply tone is received at the time it is expected.

As shown in FIG. 29, SA relay 577 applies busy tone to the calling party's line by causing CT relay 132 to operate. SA relay should also be provided with a locking path (not shown) of the type provided SSA relay 370 in FIG. 24 in order to register a system alarm for later transmission.

Figure 33:
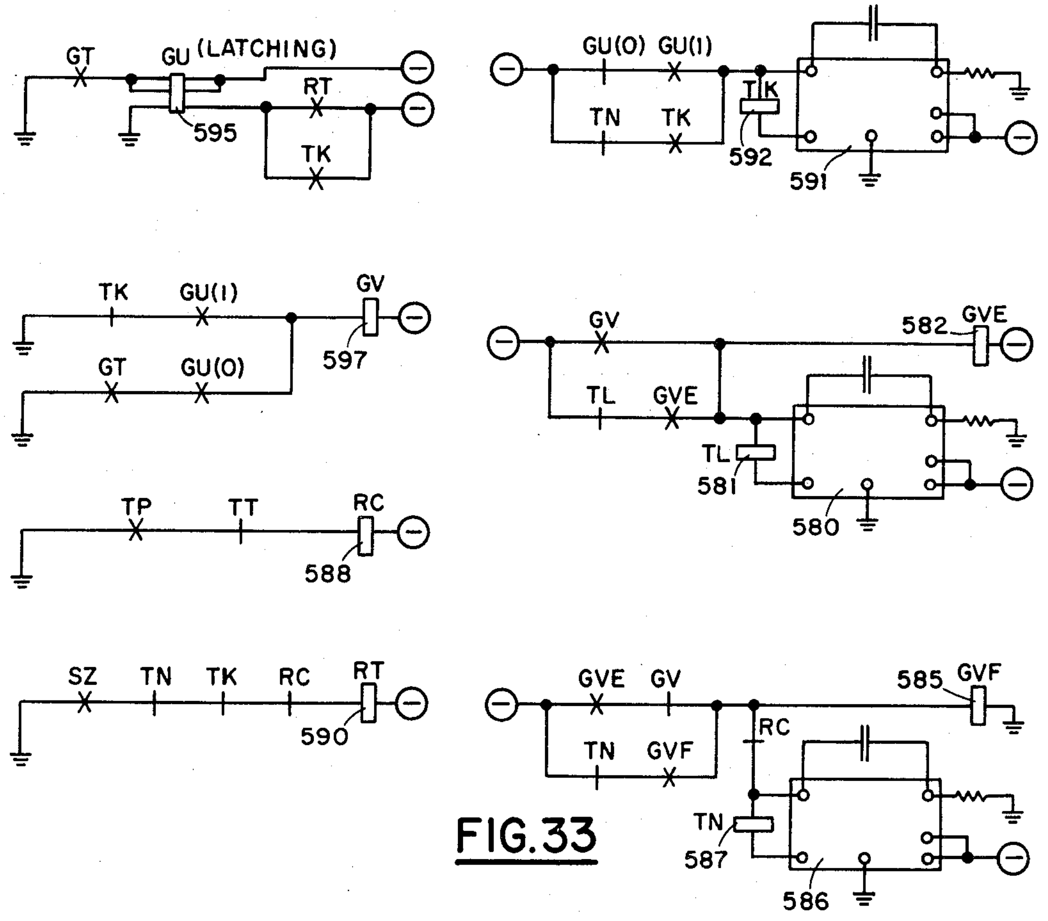
FIG. 33 is a diagram of circuits for use in the system of FIG. 28 corresponding to the circuits of FIG. 16.

The circuits for timing the transmitting of the reply tone by reply tone generators 516 and 517 and for properly sequencing receiver, transmitter and reply generator operations are shown in FIG. 33. GT relay 240 operates a latching relay GU relay 595, so that, beginning in position (o), its reset position, the first time it operates GU relay 595 latches in position (1), the next time it is energized it shifts to position (o) and latches there, the next time it shifts back to (1), and so on. It is adapted to be reset to assure its being in position (o) by the operation of RT relay 590, which keys the reply tone generator (516 or 517 as the case may be). GV relay 597 is held operated while GU relay 595 is in its position (1). The reception of the second pulse shifts GV relay 597 to the control of GT relay 240 so that it releases as soon as GT relay 240 thereafter releases. GU relay 595 may also control the transfer of the code element relay contact chains from one set of CR relays to another in the same manner as AB relay 384 in FIG. 23, or else an additional relay (not shown) may be used for that purpose. Instead of using the latching relay 595, equivalent scale of 2 counting devices or circuits, including for example, semiconductor flip clop circuits, could be used to similar effect, or ordinary relays may be used together with semiconductor timers along the lines of FIG. 23, with the simplification that only two pulses are now involved and that neither pulse is repeated alone.

From operation of GV relay 597 a number of timing operations are developed in order to produce operation of RT relay 590 at the proper time for keying the reply tone generator.

Timer 580 and TL relay 581 cause GVE relay 582 to hold operated just enough longer than GT relay 240 to allow TP relay 201 to operate in case its operation has been blocked by the operation of GV relay 597. Operation of TP relay 201 in that case must block transmission of the reply tone, which must be postponed if there is a transmission waiting. GVE relay 582 could alternatively be a slow-release relay operated by GV relay 597, but for this purpose a semiconductor timing circuit, as shown, is preferred because of its more accurate timing.

In a short period for which GVE relay 582 remains operated after GV relay 597 has released, GVF relay 585 operates and locks, activating timer 586 unless in the meanwhile RC relay 588 has been operated by TP relay 201. RC relay 588 remains operated while the transmitter sends its two-pulse message.

Whether at the service center or at the outlying central office, the reply tone is not delayed by RC relay 588 for more than one two-pulse transmission of the m.f. transmitter at that location. When TT relay 569 operates at the end of the second pulse, RC relay 588 releases and timer 586 starts timing again, while RT relay 590 operates and keys the reply tone generator (518 or 519 as the case may be), also causing timer 570 to be recycled (which in the case of m.f. transmitter 510 delays the repeat message). As in the case of FIGS. 14 and 19 SZ relay 270 must operate as a precondition for sending a reply tone. In the present case CR relay 255 and RS relay 168 should lock to GVF relay 585, instead of to GTD relay 243 which is replaced by other components in the present circuit.

If no second pulse arrives, as might happen if the first pulse received is actually the second pulse of a pair of which the first was blocked from the receiver by the operation of the local m.f. transmitter, timer 591 causes TK relay 592 to operate and lock to TN relay 587. Operation of TK relay 592 blocks the operation of RT relay 590 and hence also the generation of a reply tone. It is still necessary to reset GV relay 595 in this case. This is done by TK relay 592. Also, GV relay 597 is released by TK relay 592 and does not re-operate when GU relay 595 is reset because by this time GT relay 240 has released.

GU latching relay 595 can be used for transferring the code element relay contact chains from the facility seizure circuits to the trunk seizure circuits in the general way explained in connection with FIG. 25 and the operation of TK relay 592 can be used to reset the receiver when an incomplete message is received. An attempt to seize the wrong facility can do no harm, for if its already busy it is latched on a closed crosspoint and if it is idle the effect is purely transitory and harmless.

It is usually desirable to protect receivers from overload by having their inputs cut off during moments of transmitter operation, for example by RC relay 588 and RT relay 590. In addition, the multifrequency and reply tone receivers could well block each other by way of GT relay 240 and RPQ relay 552 respectively. For simplicity provisions for this purpose have been omitted from the drawing.

By the circuits above described the characteristics sequence of operations over the channel 500 is assured, which can be described as follows if we call the outlying office A and the service center B:

1. M.F. signal transmitted by A.
2. If waiting, reply tone transmitted by A to previous m.f. signal by B (B's lockout circuits shift).
3. If waiting, m.f. signal transmitted by B.
4. Reply tone to (1) transmitted by B (A's lockout circuit shift).
5. If waiting, m.f. signal transmitted by A.
6. Reply tone to (3) transmitted by A (B's lockout circuits shift) . . . and so on.

In a quiet period, whichever transmitter actuates the other's receiver first, by operating GV relay 597 there, blocks the other's transmitter and initiates the above sequence for as long as there is traffic. In the case of simultaneous initiation of operations from both ends ("collision"), neither receiver normally gets the message, the timer 570 is not recycled and the TY relay 565 operates at both ends. At the service center the lockout circuit and the corresponding Y relay is released as in the system of FIG. 2. TY relay 565 at the service center is preferably slower in release than that at the outlying office, so that the repeated message arrives before the service center transmitter is keyed on.

If the route is so long that when both transmitters start simultaneously they unblock the receivers at their location in time to receive the last half of the message, the final effect is the same as receipt of no message.

In the system of FIG. 28 alarm signals do not go through either of the crossbar switches. An alarm lockout circuit ahead of the multifrequency transmitter lockout circuit is preferably used, as FIG. 20, in order to use only a few codes of the first pulse transmitted for alarm and check signals, so that as many as possible remain to identify facilities seized in connection with calls to be connected. In a service center system, though the inward destinations are few, the facilities shared are often numerous and if the latter are more than 97, a system of the type of FIG. 28 may have to go to 3 pulse messages, or use some information from the second pulse to complete the identification of the facility seized at the originating end. This situation is a disadvantage of the arrangement of FIG. 28 that emphasizes the flexibility of the type of system shown in FIGS. 1 and 2 where large numbers of facilities are involved. The higher speed of one-pulse transmission also counts when the system approaches full load on the multifrequency signal transmitters and receivers.

Alarm signals in a system of the type of FIG. 28 should not use more than one or two of the available codes for the first pulse, just enough for the receiver to recognize the signal as an alarm signal. Only about 100 codes are available in the second pulse to differentiate between kinds of alarm and their locations. If only a few locations are reporting alarms over the channel 500, that number of codes will be sufficient. Otherwise three pulses will be necessary for alarms.

The check signal circuit of the type shown in FIG. 19, sends only one pulse. The check circuit 522 of FIG. 28, however, can readily be arranged to send two identical pulses, the second of which is merely redundant, so that the timing circuits of the system need not be altered. Since the check circuit operates only during idle periods of the system, the time taken by the redundant pulse is of no consequence.

The embodiments of the invention in which an exclusive property or privilege is claimed are defined as follows:

1. An audio pulse signaling system both for transmitting alarm signals from an outlying communication central office to a communications service center and for completing call connections between outgoing trunk circuits organized in groups at said office and incoming trunk circuits organized in groups at said center, comprising:

a. an audio pulse coding transmitter at said outlying office adapted to send a single pulse or a sequence of not more than three independently coded pulses on each transmission;

b. means at said outlying office for deriving alarm initiating and alarm cancelling signals from the condition of a plurality of alarm detectors and an alarm reporting circuit associated therewith adapted to be activated by said means;

c. lockout circuits respectively associated with each outgoing trunk circuit and with each alarm signal deriving means for sequencing demands for signal transmission concurrently presented to said transmitter;

d. means associated with each of said lockout circuits for coding said transmitter in accordance with switching information related to the circuits associated with said lockout circuit at said central office or in accordance with alarm information related to one of said alarm signal deriving means associated with said lockout circuit;

e. a switch or combination of switches at said office associated with said outgoing trunk circuits and with said alarm reporting circuit and a switch or combination of switches at said center associated with said incoming trunk circuits, said switches being also associated with a plurality of communication channels connecting corresponding elements of the said respective switches or combinations of switches;

f. an audio pulse decoding receiver at said center adapted to decode said coded pulses or pulse sequences and to activate the said switch or combination of switches at said center in response to a pulse or sequence of pulses coded in accordance with switching information and likewise to register changes in alarm detector conditions in response to a pulse or sequence of pulses coded in accordance with an alarm initiating or alarm cancelling signal;

g. a reply tone generator at said center associated with the aforesaid receiver;

h. a reply tone receiver at said office associated with said audio pulse coding transmitter;

i. means for causing said reply tone generator to transmit a pulse in response to actuation of said switch as aforesaid by said audio pulse decoding receiver and likewise in response to registration of a change in alarm detector conditions by said audio pulse decoding receiver;

j. means associated with said reply tone receiver and responsive to reception of a reply tone pulse adapted to release one of said lockout circuits and thereby permit activation of another;

k. time-out means for releasing one of said lockout circuits and permitting activation of another in the event said release means associated with said reply tone receiver does not operate in normal sequence, and l. means operative after the release by said time-out of a lockout circuit associated with one of said alarm signal deriving circuits for causing the timed-out alarm signal to be repeated at intervals until its transmission is followed by reception of a reply tone pulse in normal sequence.

2. An audio pulse signaling system between a principle and a subsidiary switching center adapted both to transmit a variety of automatic technical alarms and also to complete connections between outgoing and incoming trunk circuits organized in groups at said switching centers, comprising:

a. an audio pulse coding transmitter at each of said switching centers adapted to send a single pulse or a sequence of not more than three independently coded pulses on each transmission;

b. means at one or both of said centers for deriving alarm initiating and alarm cancelling signals from the condition of a plurality of alarm detectors and an alarm reporting circuit associated therewith adapted to be activated by said means;

c. lockout circuits respectively associated with each outgoing trunk circuit and with each alarm signal deriving means for sequencing demands for signal transmission concurrently presented to each of said transmitters;

d. means associated with each of said lockout circuits for coding one of said transmitters in accordance with switching information related to the circuits associated with said lockout circuit or in accordance with alarm information related to one of said alarm signal deriving means associated with said lockout circuit;

e. a switch or a combination of switches at each of said centers associated with said outgoing and incoming trunk circuits at least one of said switches or combinations of switches being also associated with one of said alarm reporting circuits, both of said switches being also associated with a plurality of communication channels connecting corresponding elements of the said respective switches or combinations of switches;

f. an audio pulse decoding receiver at each of said centers adapted to decode said coded pulse sequences and to actuate one of the said switches or combinations of switches in response to a pulse or a sequence of pulses coded in accordance with switching information, at least one of said receivers being further adapted to register changes in alarm detector conditions in response to a pulse or a sequence of pulses coded in accordance with an alarm initiating or alarm cancelling signal;

g. a reply tone generator at each of said centers associated with the said audio pulse coding transmitter at said center;

h. a reply tone receiver at each of said centers associated with the said audio pulse decoding receiver;

i. means for causing each of said reply tone generators to transmit a pulse in response to actuation of one of said switches as aforesaid by said associated audio pulse decoding receiver and means for causing at least one of said reply tone generators likewise to transmit a pulse in response to registration as aforesaid of a change in alarm detector conditions by said associated audio pulse decoding receiver; said means being arranged either for immediate transmission of said pulse or for transmission thereof after a single intervening audio pulse transmission in the direction opposed to that of the last previous audio pulse transmission;

j. means associated with said reply tone receiver responsive to reception of a reply tone pulse adapted to release one of said lockout circuits and thereby permit activation of another;

k. time-out means at each of said centers for releasing one of said lockout circuits and permitting activation of another in the event said release means associated with said reply tone receiver at said center does not operate in normal sequence, and l. means operative after the release by said time-out means of a lockout circuit associated with one of said alarm signal deriving circuits for causing a timed-out alarm report to be repeated at intervals until the transmission of the alarm signal is followed by reception of a reply tone pulse in normal sequence.

3. An audio pulse signaling system as defined in claim 2 in which the said coding transmitter at one of said switching centers is adapted, upon failure of a transmission or of a portion of a transmission to be followed by reception of a reply tone pulse in normal sequence, to repeat said transmission or said portion of said transmission without first releasing the active lockout circuit, but in which at the other of said switching centers under corresponding conditions said time-out means is adapted to release the active lockout circuit at said other switching center.

4. An audio pulse signaling system as defined in claim 3 in which said time-out means, when releasing a lockout circuit associated with a trunk circuit and not an alarm signal deriving means is adapted to apply an intermittent tone (of the type connoting a busy condition) to said trunk circuit.

5. An audio pulse signaling system as defined in claim 3 in which:

m. one of the switching centers is a service center normally having much incoming traffic, including all the alarm signals, and relatively little outgoing traffic;

n. at said service center at least part of the incoming trunk circuits may be reached from similar systems serving other routes;

o. the said audio pulse receiver at said service center is adapted to cause selective connection of one of said incoming trunk circuits to the said switch or combination of switches at said service center, and p. the said audio pulse transmitter at said service center is the transmitter adapted to release a lockout circuit upon failure of the said reply tone receiver at said service center to receive a reply tone pulse in normal sequence.

6. An audio pulse signaling system as defined in claim 5 in which:

q. the said audio pulse receiver at the said service center is adapted to provide to a called service position an indication of the origin of the call when it activates the said switch or combination of switches to connect a trunk circuit that may be reached from similar systems serving other routes.

7. An audio pulse signaling system as defined in claim 3 in which:

r. said means for causing one of said reply tone generators to transmit a pulse is adapted to do so immediately after the reception by one of said audio pulse decoding receivers of a complete coded audio pulse transmission;

s. an audio detector is associated with each of said communication channels at each of said centers and is adapted upon the reception of the first audio pulse of a sequence to connect the said channel to the nearer of said audio pulse decoding receivers by means of a connection adapted to hold for the entire pulse sequence, including the transmission of a reply tone pulse, and which is also adapted to mark the said channel busy for the duration of said sequence;

t. means are provided in said system for blocking the operation of a hold magnet by any of said lockout circuits associated with one of said audio pulse coding transmitters during the reception of a pulse by the audio pulse decoding receiver at the same switching center and during the immediately following transmission of a pulse of reply tone, and u. means are also provided for disconnecting said audio detector from said channel when said channel is connected to a trunk circuit through the nearer of said switches or combination of switches.

8. An audio pulse signaling system as defined in claim 7 in which:

v. each coded audio pulse sequence is either a single pulse or two identical pulses, w. one of said transmitters is arranged to transmit only a single pulse for each lockout circuit activation and the other of said transmitters is arranged to transmit a repetition of a pulse when the first pulse is not followed by reception of a reply tone pulse in normal sequence, and x. said coded audio pulses are coded multifrequency pulses.

9. An audio pulse signaling system as defined in claim 7 in which:

y. coded audio pulse sequences for alarm initiating or alarm cancelling signals consists of 2 or 3 pulses, but coded audio pulse sequences for completing connections at said switches or combination of switches consist of a single pulse except when repeated for failure to receiver a reply tone pulse and z. said coded audio pulses are coded multifrequency pulses, ab. the said reply tone generator at said service center is adapted to transmit a reply tone pulse after receipt of the first pulse of an alarm initiating or alarm canceling signal, ac. the said audio pulse coding transmitter which is not at the service center is adapted to repeat said first pulse of an alarm initiating or alarm cancelling signal if the audio pulse decoding receiver at its location fails to receive a reply tone pulse in normal sequence, ad. the said reply tone generator is also adapted to transmit a reply tone pulse after receipt of a complete alarm initiating or alarm cancelling signal and the said audio pulse coding transmitter is adapted to repeat said complete alarm initiating or alarm cancelling signal at once immediately, and thereafter at intervals, until a reply tone pulse is received in normal sequence.

10. An audio pulse signaling system as defined in claim 2 in which:

i. said lockout circuits each contain a relay adapted to be operated while its lockout circuit is active;

ii. another relay is provided to hold in one of its positions while any one of said lockout circuits is active and adapted to remain in such position during sequencing of lockout circuits not blocked by said other relay, said other relay being adapted to block lockout circuits by which access to a transmitter is sought while another lockout circuit is active.

11. An audio pulse signaling system as defined in claim 10 in which:

iii. outgoing alarm reporting circuits are adapted to cause transmission of alarm signals having not less than two nor more than three independently coded pulses;

iv. an additional set of lockout circuits is provided adapted to sequence access of alarm signals to an alarm reporting circuit, but access to lockout circuits of said additional set is available subject to random serial activation, whether or not such lockout circuit is made ready for activation while another lockout circuit was active.

12. An audio pulse signaling system as defined in claim 2 in which said alarm reporting circuits are adapted to cause transmission of alarm signals having at least one more pulse than the signals caused to be transmitted by said outgoing trunk circuit, in which said alarm reporting circuits are adapted or their associated lockout circuits are adapted to change the response frequency or frequency combination of a reply tone receiver and said audio pulse decoding receiver at said principal switching center is adapted, upon reception of an alarm signal, to make a corresponding change in the output frequency or frequency combinations of the said reply tone generator at said center.

13. An audio pulse signaling system as defined in claim 2 in which:

mm. said coding transmitter and decoding receiver and said reply tone generator and receiver at one switching center are connected to corresponding equipment at the other switching center by a channel that is not available for connections at said switches or combinations of switches;

nn. said coding transmitters and decoding receivers are adapted to transmit and receive respectively, sequences of not less than two and nor more than three multifrequency pulses, oo. said decoding receivers are adapted to be reset without interference with trunk circuits or alarm registration in the event a complete pulse sequence is not received;

pp. said decoding receivers are adapted to prepare for the transmission of a reply tone pulse after the reception of a complete pulse sequence but said reply tone generators and said coding transmitters are arranged so that if after such reception the coding transmitter at the same switching center is ready to transmit, the operation of the reply tone generator is deferred until the said transmitter finishes transmitting one complete multifrequency pulse sequence, qq. said time-out means is adapted to be reset by the operation of the reply tone generator of the same switching center and also by upon the reception of a multifrequency pulse sequence by the decoding receiver at the same switching center, in each case for the duration of said operation or reception.

14. An audio pulse system as defined in claim 13 in which the said coding transmitter at one of said switching centers is adapted, upon failure of the transmission of a sequence of multifrequency pulses to be followed by reception of a reply tone pulse in normal sequence, to repeat said transmission and to enable said time-out means to release the active lockout circuit only after the completion of said repeated transmission; whereas the said coding transmitter at the other switching center is arranged to cause said time-out means to release the active lockout circuit following the original multifrequency pulse sequence transmission, said release by said time-out means being arranged to occur if reception of a reply tone pulse does not occur in normal sequence.

15. An audio pulse signaling system as defined in claim 13 in which the said transmitters and receivers are adapted to transmit and receiver, respectively, sequences of two multifrequency pulses.

16. An audio pulse signaling system as defined in claim 15 in which:

rr. the switching centers at which said transmitter is not arranged to repeat its transmission as stated in claim 14 is located at a service center designed to handle much incoming traffic, including all the alarm signals, and relatively little outgoing traffic, ss. at said service center at least part of the incoming trunk circuits may be reached from similar systems serving other routes, and tt. the said audio pulse receiver at said service center is adapted to cause selective connection of an idle one of said incoming trunk circuits to the said switch or combination of switches at said service center.

17. A system for directing auxiliary telephone communications and automatic alarm signals between an outlying central office and a service center separately from toll communication facilities which comprises:

a. a multiplicity of communication channels between said outlying central office and said service center, each having a facility circuit at each end;

b. a multiplicity of outgoing trunk circuits at said central office and a multiplicity of incoming trunk circuits at said service center;

c. a large access switch or combination of switches at said central office and another at said service center, each adapted to connect any of said facility circuits at its location and the associated channel to any of a greater number of said trunk circuits;

d. a signal transmitter at said outlying central office adapted to transmit coded multifrequency audio pulses;

e. at least one trunk circuit at said central office adapted to activate the transmission of alarm signals to said service center;

f. means associated with at least one alarm detector for generating alarm initiating and alarm cancelling signals in circuits individual to each signal content and for causing transmission of said signals over said alarm trunk circuits;

g. lockout circuits respectively associated with each of said outgoing trunk circuits and with each alarm initiating signal circuit and also with each alarm cancelling signal circuit adapted to activate said signal transmitter at the same time as said trunk circuit seizes one of said facility circuits, said lockout circuits being arranged also to initiate both the activating of said transmitter and the seizure as aforesaid of said facility circuit and to determine the frequency makeup of the pulses transmitted by said signal transmitter;

h. a multifrequency receiver and a reply tone generator at said service center;

i. an audio frequency detector connected at each of said facility circuits at said service center, except during progress of a call on a completed connection, and adapted to quickly connect said multifrequency receiver and said reply tone generator to said facility circuit and to make said facility busy when an audio frequency signal is received over said facility;

j. means at said multifrequency receiver to activate if available an idle trunk circuit serving a destination at said service center identified by said audio frequency signal in a manner adapted to complete a connection to said last-mentioned facility circuit, to activate said generator to transmit a reply tone pulse after completion of said connection, to hold said connection of said receiver to said facility circuit during the foregoing operations and to release it thereafter; said connection being usable for connecting also said generator to said facility circuit;

k. means operable by said multifrequency receiver to produce an appropriate indication at said service center in response to a multifrequency pulse identifying an alarm signal, to activate said generator to transmit a reply tone pulse after reception of said pulse and likewise to hold said connection to said facility circuit during the foregoing operations and to release it thereafter;

l. a reply tone receiver at said outlying central office and circuits operated by the output thereof adapted to cause said transmitter to repeat a multifrequency signal once when said reply tone is not received in a predetermined interval following the first transmission of said signal;

m. means associated with each of said outgoing trunk circuits responsive to reception of reply tone by said reply tone receiver and adapted to release the said lockout circuit associated with said trunk circuit and the connection thereby made to said multifrequency transmitter, and n. means associated with each of said outgoing trunk circuits, responsive to failure of said reply tone receiver to receive reply tone within a predetermined period following the aforesaid repeated transmission of a signal adapted to release the said lockout circuit and to apply to such trunk circuit a tone signal connoting a circuit busy condition.

18. A system as defined in claim 17 in which means are provided for seizing one of said channels and associated facility circuits by a call from said service center initiated manually by an operator, in which means are also provided for indicating to such operator which of said channels are idle and in which a plurality of incoming trunk circuits are provided at said outlying central office adapted to be seized by a facility circuit at said central office without connection through said large access switch at said central office when the facility at the other end of said channel is seized by said manually initiated call as aforesaid.

19. A system as defined in claim 18 in which said manually initiated means for seizing a channel is arranged not to cut off reception by said multifrequency receiver at said service center of a signal transmitted immediately before seizure of said channel, and is further arranged to make or block an indication to the caller if said receiver receives a multifrequency signal so transmitted.

20. A system as defined in claim 17 in which means are provided for causing transmission of a pulse of a particular frequency code at intervals after said signal transmitter has been idle for a predetermined period, said means being adapted to register an alarm and cause generation of an alarm initiation signal if no reply tone pulse is received in reply and to cancel an alarm so registered and to cause generation of an alarm cancelling signal if a subsequent transmission of a pulse of said code is duly followed by reception of a pulse of reply tone.

21. A system as defined in claim 18 in which means are provided responsive to a busy condition of a predetermined proportion of said communication channels adapted to block access to the remainder of said communication channels against all traffic from said outlying office except operator assistance calls and alarm signals.

22. A system as defined in claim 17 having also:

o. means, associated with said alarm trunk circuit, responsive to failure of said reply tone receiver to receive reply tone within a predetermined period following the aforesaid repeated transmission of a signal adapted to release the said lockout circuit and thereafter to cause repetition of said alarm signal at intervals until a reply tone pulse is duly received.

23. A system as defined in claim 17 in which:

p. said lockout circuits each contain a relay adapted to be operated while its lockout circuit is active, a transistor and a diode, said diodes being connected to a common electric current supply in a manner adapted to permit only one of said diodes to conduct and one of said relays to be operated at one time;

q. another relay is provided adapted to hold in one of its positions while any one of said lockout circuits is active and adapted to remain in such position during the interval of transfer of activity from one of said diodes to another, said relay controlling contacts adapted to block access to a lockout circuit from a circuit that requests such access while said relay is in its said position, and permits such access only after previous requesting for such access have been served and the lockout circuits released.

24. A system as defined in claim 17 in which means are provided for directing calls from said service center to telephones served by said outlying central office which means comprise:

at said service center, outgoing trunk circuits, lockout circuits, a signal transmitter and a reply tone receiver and at said outlying central office audio detectors, a multifrequency receiver, a reply tone generator and incoming trunk circuits all organized together and adapted to make connections between said outgoing trunk circuits at said service center and said incoming trunk circuits at said central office through said large access switches or combinations of switches in substantially the same way as connections specified in said claim 17 for calls in the other direction, except that the said signal transmitter at the central office is not adapted to repeat a signal but instead means associated with said outgoing trunk circuits are adapted to release the associated lockout circuit and apply busy tone in the event said reply tone receiver at said central office fails to receive reply tone shortly after the first transmission of a signal by the said signal transmitted at said central office.

25. A combined system for directing the connection of telephone calls to and from a telephone service center and for the reporting of automatic alarms to said telephone service centers, which comprises:

a. audio pulse signaling equipment at said service center and at an outlying central office, b. a large access switch at said service center and another one at said outlying central office, c. a multiplicity of communication channels available for linking said switches, d. incoming and outgoing trunk circuits respectively, accessible from and having access to said switches;

e. means adapted to produce, from the output of at least one alarm detector, alarm initiation signals and alarm cancelling signals;

f. means adapted to utilize said audio pulse signaling equipment to set up connections between one of said outgoing trunk circuits and one of said incoming trunk circuits over said switches and one of said channels and then to disengage said audio pulse signaling equipment from said trunk circuits so connected;

g. means adapted to utilize said audio pulse signaling equipment to transmit alarm signals from said first mentioned means to an alarm registry at the said service center, without passing through the said switch at the said service center and, thereafter promptly to disengage said audio pulse signaling equipment, and h. lockout circuits within each of said two last-mentioned means adapted for serial processing of call connections and alarm signals on an intermixed basis.

26. A system as defined in claim 25 in which said audio pulse signaling equipment includes a multifrequency audio pulse transmitter and a multifrequency audio pulse receiver at said service center and one of each at said outlying central office and a reply tone generator and a reply tone receiver at said service center and one of each at said outlying central office and in which said reply tone generators are respectively associated with said multifrequency receivers and said reply tone receivers are associated with said lockout circuits in a manner adapted to release a lockout circuit upon reception of a pulse transmitted from one of said reply tone generators.

27. A system as defined in claim 26 in which said audio pulse signaling equipment is arranged to transmit coded pulses over one of said channels selected from those thereof that are idle in a predetermined sequence established in electric circuit logic and in which said audio pulse signaling equipment includes an audio detector for each of said channels adapted, when activated by any audio pulse, to operate an element of one of said switches, to mark said channel busy and to connect said channel to a decoding audio pulse receiver and includes also means for holding the connection established between said channel and said receiver during the time necessary to set up a connection over the aforesaid one of said switches and during transmission of a reply tone pulse or during the time necessary to operate an alarm registry circuit and to transmit a reply tone pulse thereafter.

28. A system as defined in claim 27 in which said multifrequency audio pulse transmitters and said reply tone generators are adapted to make transmissions consisting of a single pulse except that said multifrequency audio pulse transmitter at said outlying central office is adapted to repeat its pulse if it is not followed by reception of a reply tone pulse.

29. A system as defined in claim 27 in which said multifrequency audio pulse transmitters are adapted to transmit single pulse transmissions for establishing telephone connections and transmissions of a sequence of two or three pulses for transmission of alarm signals and in which the multifrequency audio pulse transmitter at the outlying central office is arranged so as to repeat once its single pulse transmissions or the first pulse of its multipulse transmissions if no reply tone pulse is received within a predetermined period following said single or first pulse transmission.

30. A system as defined in claim 2 having means responsive to the failure of reply tone to be received at said outlying central office within a predetermined period following the transmission of a complete multipulse alarm signal or of a repeated complete single pulse alarm signal adapted to cause repetition at intervals of transmission of said alarm signal until a reply tone pulse is duly received.

31. A system as defined in claim 27 in which means are provided for causing transmission of an audio pulse of a particular frequency code at intervals after both the multifrequency transmitter and the multifrequency receiver at the location where such means are provided have been idle for a predetermined period, said means being adapted to register an alarm and cause generation of an alarm initiation signal if no reply tone pulse is received in reply and to cancel an alarm registered and cause generation of an alarm cancelling signal if a subsequent transmission of a coded pulse is duly followed by reception of a pulse of reply tone.

32. A system as defined by claim 29 in which, in said means for producing said alarm signals, said lockout circuit is adapted to change the response frequency or frequency combination of said reply tone receiver at said outlying central office and in which said multifrequency receiver at said service center is adapted, upon reception of an alarm signal, to make a corresponding change in the output frequency or frequency combination of the said reply tone generator at said service center.

33. A system as defined in claim 26 in which means are provided responsive to a busy condition of a predetermined proportion of said communication channels adapted to block access to the remainder of said communication channels against all traffic from said outlying office except operator assistance calls and alarm signals.

* * * * *